United States Patent
Furutono et al.

(10) Patent No.: US 6,687,230 B1
(45) Date of Patent: Feb. 3, 2004

(54) ROUTING SYSTEM AND METHOD

(75) Inventors: Tomoyuki Furutono, Fukuoka (JP); Fumiharu Etoh, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/347,220

(22) Filed: Jul. 2, 1999

(30) Foreign Application Priority Data

Dec. 2, 1998 (JP) .......................................... 10-343311

(51) Int. Cl.[7] .......................... H04L 12/28; H04L 12/56
(52) U.S. Cl. ..................... 370/238; 370/252; 370/395.1
(58) Field of Search ............................. 370/395.2, 238, 370/238.1, 236.1, 351, 400, 401, 254, 255, 237, 395.1, 252; 709/220, 223

(56) References Cited

U.S. PATENT DOCUMENTS

| | | | | |
|---|---|---|---|---|
| 5,289,462 A | * | 2/1994 | Ahmadi et al. | 370/232 |
| 5,940,480 A | * | 8/1999 | Jeon et al. | 370/252 |
| 5,987,320 A | * | 11/1999 | Bobick | 370/241 |
| 6,118,936 A | * | 9/2000 | Lauer et al. | 370/244 |
| 6,144,641 A | * | 11/2000 | Kaplan et al. | 370/238 |
| 6,230,203 B1 | * | 5/2001 | Koperda et al. | 370/463 |
| 6,256,309 B1 | * | 7/2001 | Daley et al. | 370/395.43 |
| 6,370,119 B1 | * | 4/2002 | Basso et al. | 370/252 |
| 6,442,615 B1 | * | 8/2002 | Nordenstam et al. | 709/241 |

FOREIGN PATENT DOCUMENTS

JP  9-247188  9/1997

* cited by examiner

*Primary Examiner*—Chau Nguyen
*Assistant Examiner*—Soon-Dong Hyun
(74) *Attorney, Agent, or Firm*—Katten Muchin Zavis Rosenman

(57) ABSTRACT

A routing system includes a route information management unit for managing standardized network route information, an event processing unit for managing event information obtained by detecting and statistically processing events in a local node, and a routing unit for designating an optimum route for a call connection request based on the standardized network route information managed by the route information management unit and the event information managed by the event processing unit. Hence, the routing system can designate a higher-quality route than that designated only by the route information managed by the route information management unit and the convenience of the node can be improved.

15 Claims, 33 Drawing Sheets

FIG. 5 PRIOR ART

| GENERATING SOURCE NODE ID |
|---|
| ACCOMMODATION ADDRESS 1 |
| ACCOMMODATION ADDRESS 2 |
| . |
| . |
| . |

| GENERATING SOURCE NODE ID |
|---|
| PORT ID |
| MAXIMUM CELL RATE |
| AVAILABLE CELL RATE |
| CELL TRANSFER DELAY |
| CELL DELAY VARIATION |
| CELL LOSS RATE |
| WEIGHT OF SELECTED DIRECTION |
| . |
| . |
| . |

| GENERATING SOURCE NODE ID |
|---|
| SOURCE NODE ID |

FIG. 10

| ALERT | ALERTING |
|---|---|
| CALL PROC | CALL PROCEEDING |
| CONN | CONNECT |
| SETUP | SETUP |
| REL | RELEASE |
| REL COMP | RELEASE COMPLETE |
| REST | RESTART |
| REST ACK | RESTART ACKNOWLEDGE |
| NOTIFY | NOTIFY |
| STATUS | STATUS |
| STATUS ENQ | STATUS ENQUIRY |

FIG. 12

IN AN ARROW DIRECTION
- AVAILABLE CELL RATE (ACR)
- CELL TRANSFER DELAY (CTD)
- CELL DELAY VARIATION (CDV)
- ADMINISTRATIVE WEIGHT (AW)
ETC.

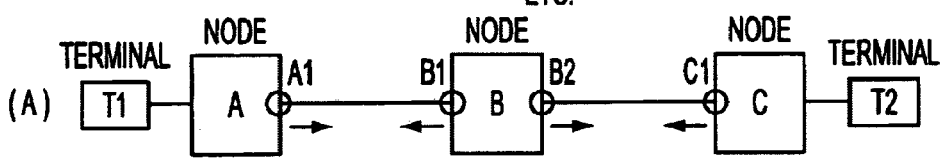

(A) RESOURCE STATUS COLLECTION

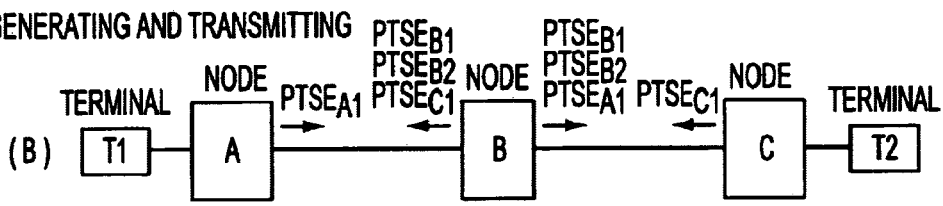

(B) GENERATING AND TRANSMITTING (C) HOLDING PTSE

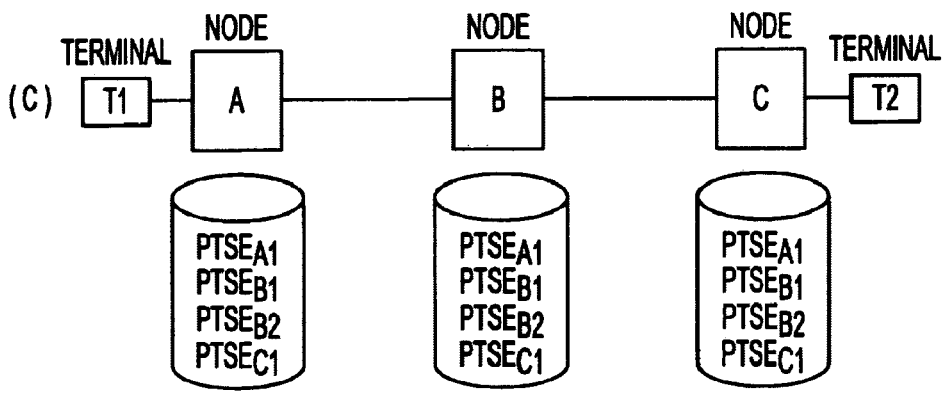

(D) ROUTE-COST CALCULATION (THE SAME FOR ALL NODES)

| A→B | A→C | C→A | B→A | ... |
|---|---|---|---|---|
| ACR: $ACR_{A1}$<br>CTD: $CTD_{A1}$<br>CDV: $CDV_{A1}$<br>AW: $AW_{A1}$ | ACR: $MIN(ACR_{A1}, ACR_{B2})$<br>CTD: $CTD_{A1} + CTD_{B2}$<br>CDV: $CDV_{A1} + CDV_{B2}$<br>AW: $AW_{A1} + AW_{B2}$ | ACR: $MIN(ACR_{C1}, ACR_{B1})$<br>CTD: $CTD_{C1} + CTD_{B1}$<br>⋮ | ... | ... |

FIG. 17

THRESHOLD 10%

| ROUTE | FREQUENCY OF CALL CONNECTION NG |
|---|---|
| ROUTE(i) | 15% |
| ROUTE(ii) | 0% |

FIG. 20

THRESHOLD 10%

| ROUTE | FREQUENCY OF CALL RELEASE |
|---|---|
| ROUTE(i) | 20% |
| ROUTE(ii) | 5% |

FIG. 24

| ROUTE | FREQUENCY OF CALL DISCONNECTION |
|---|---|
| ROUTE(i) | 15% |
| ROUTE(ii) | 0% |

THRESHOLD 10%

FIG. 27

THRESHOLD 10%

| ROUTE | FREQUENCY OF RECEIVING NODE-CORRESPONDING ROUTE INFORMATION |
|---|---|
| ROUTE(i) | 15% |
| ROUTE(ii) | 0% |

FIG. 30

THRESHOLD 10%

| ROUTE | AVAILABLE CELL RATE |
|---|---|
| ROUTE(i) | 1 Mbps |
| ROUTE(ii) | 5 Mbps |

ROUTING SYSTEM AND METHOD

BACKGROUND OF THE INVENTION

1. Field of the Invention

The present invention relates to a routing system and method, and more particularly to a routing system and method capable of designating an optimum route by exchanging network route information held by each node with adjacent nodes thereof.

2. Description of the Related Art

Conventionally, in a PNNI (Private Network-Network Interface) which is specified by an ATM Forum, an optimum route from a source node to a destination node is designated by periodically or non-periodically exchanging network route information held by each node with adjacent nodes so as to perform a call control.

A PNNI node (as a local node) periodically transmits resource information to the adjacent nodes thereof. The resource information includes an address of the local node, an address of a terminal accommodated in the local node, available cell rates of transmission lines and the like. Each of the adjacent nodes, which have received the resource information, holds the resource information to make a database by which a status of a PNNI network can be understood. The adjacent nodes further transmit the received information to adjacent nodes thereof. Thus, resource information about all nodes of the PNNI network can be held by each node.

FIG. 1 shows resource information which is held in a PNNI network consisting of nodes A, B and C. The node A holds resource information A1, A2 and A3. The information A1 is node A network prefix information. The information A2 is about a status such as an available cell rate and the like of a line from the node A to the node B. The information A3 is about a status such as an available cell rate and the like of a line from the node A to the node C. The nodes B and C have similar resource information. The resource information held by the nodes A, B and C is exchanged between the nodes A, B and C so that information about the entire network can be held by each node. A detailed description thereof will be given later.

According to a database made based on the above-mentioned resource information, a source/originally-transmitting node in the PNNI network can acknowledge which routes may get to a destination node and select an advantageous route of these routes from a given viewpoint of, for example, cost, cell transfer delay, cell delay variation or the like. This is referred to as a source routing.

FIG. 2 shows an example of the source routing by the PNNI.

FIG. 2 shows three routes (i), (ii) and (iii) which may be used to perform a call setup from a terminal T1 accommodated in a node A to a terminal T3 accommodated in a node C. If the node A is preset to select an advantageous route according to the cell delay, then the node A examines the cell delay item in a routing database DB and designates the route (i) because the cell delay of the route (i) is shortest. Further, when a status of the PNNI network is varied, the PNNI node can detect the variation and issue a notification of the variation in the PNNI network.

FIG. 3 shows a notification of resource information being transmitted in a PNNI network. In the diagram, when resource information of a node A is varied, the node A transmits the varied resource information (namely the resource information A1, A2 and A3) to the other nodes B and C. The nodes B and C further transmit the resource information A1 to A3 received from the node A to their adjacent nodes, namely the node C and the node B, and thus the resource information about the node A can be spread on the whole PNNI network.

Further, a node of the PNNI network is provided with a crankback procedure. When a node (as a routing source node) has missed receiving a notification of a variation in the network status and then performs a routing based on outdated network information, a PNNI node which detects the variation notifies the routing source node so as to perform the crankback procedure. If the crankback procedure is not used, then a call loss may occur and a terminal may need to send a call setup message again so as to reestablish the connection. If the crankback procedure is used, then the terminal can ensure the call through another available route without having to reestablish the connection.

FIG. 4 shows an example of the crankback procedure of the PNNI. The node A sends a setup message to the node C (①), the node C fails in bandwidth hunt on a line connecting the node A and the node C due to receiving the setup message (②), the node C sends a release message (REL) including a crankback information element to the node A (③), and the node A designates an alternate route via the node B by analyzing the received crankback information element (④). In addition, the crankback information element includes call reject causes (for example, user cell rate not being available, failure in VPCI/VCI hunt, etc), and a call reject occurrence position (reject-occurred node identifier which is equivalent to a network prefix, reject-occurred port of the node and the like).

FIG. 5 shows representative items indicating a resource status which items should be transmitted. These items are regulated by a conventional ATM Forum Private Network-Network Interface Specification Ver 1.0 (hereinafter referred to PNNI) and are formed to be a packet, referred to as PTSE, (PNNI Topology State Element) so as to be delivered as difference information to neighboring nodes. A packet for notifying a line resource status corresponds to A2, A3, B2, B3, C2, and C3 of FIG. 1. A packet for notifying a local node ID corresponds to A1, B1, C1 of FIG. 1. A packet (not shown) for transmitting an address of a locally accommodated terminal is used in a case in which it is needed to clearly notify other nodes of the address of the terminal which is accommodated in the local node. These packets are integrated with respect to the whole network so that a PNNI node can obtain information about routes to another PNNI node (the number of the routes, natures of the respective routes, and the like).

A PNNI node (source node), which receives a calling request from a terminal accommodated therein, designates an optimum route getting to a destination node and produces a list including ID information of transit nodes on the optimum route, a node-passing-through order and information which indicates outgoing link at each node. The list is referred to as "a route designation list".

The source node sends a call setup message including the route designation list to the next node. The next node which has received the call setup message examines the list included in the setup message so as to select an outgoing link through which to forward the setup message.

The calling request may be rejected on the way in a case in which the network status is varied after the setup message is sent, or a notification of a variation in the network status does not yet reach the source node at the time the setup message is sent. In this case, by using the above-mentioned crankback procedure, the call setup via another route is performed again in the network.

FIG. 6 is a block diagram showing an example of a conventional node. In the diagram, a call control unit 17 issues "a route look-up request" to a routing unit 14 when a call setup is requested, and as a response the routing unit 14 notifies the call control unit 17 of a route to the destination. The routing unit 14 collects route information from a route information management unit 12 so as to generate the destination route notification for the call control unit 17. The route information management unit 12 receives route information (resource information) delivered from other nodes, sends local node information and information about the other nodes, and stores these information as the routing information. A route information transmitting/receiving unit 11 delivers information between the other nodes and the route information management unit 12. A route information display unit 15 displays the routing information held by the route information management unit 12 to users.

Conventionally, each node, when resource information therein is varied, notifies other nodes of the variation. The other nodes, which have received the variation information, update their databases according to the received information. Thus, the database only indicates a network resource status obtained at the time when the database is referred to. Hence, as a result of the routing, the call may be rejected due to reasons that cannot be determined from the database, such as non-arrival of resource variation information, receiving incorrect resource information obtained by a node-processing error and the like.

In order to designate an optimum route to a destination node in a network, a source node refers to a database thereof from the given viewpoints of cost, cell transfer delay, cell delay variation and the like which are obtained at the time when the database is referred to. For this reason, when node congestion and line failures frequently occur on a route to be designated, avoiding designating the route cannot be realized. That is, the route is designated at the time when the database is referred to, hence problems that have occurred in the past on the route are taken into consideration in the routing.

Thus, when a call setup is requested for a congested node, the congestion of the node further increases and delay of the call setup further extends due to passing through the congested node. Moreover, an established connection may be abnormally disconnected due to designating a route on which the line failures frequently occur. Furthermore, when a node which advertises incorrect rooting information caused from functional abnormality of itself exists in a network, a source node cannot detect its being abnormal and executes a wrong route selection based on incorrect database information.

SUMMARY OF THE INVENTION

It is a general object of the present invention to provide a routing system, in which the above problems are eliminated.

A more specific object of the present invention is to provide a routing system and method capable of designating an optimum route based on route information and event information, the optimum route having a higher quality than that designated based on only the route information, and to improve the convenience of nodes.

The above object of the present invention is achieved by a routing system capable of designating an optimum route for a call connection request, the routing system comprises a route information transmitting/receiving unit which exchanges standardized network route information of a local node with adjacent nodes thereof; a route information management unit which manages the standardized network route information as routing information; an event processing unit which manages event information besides the standardized network route information, the event information being obtained by detecting and statistically processing events in the local node; and a routing unit which designates an optimum route for a call connection request based on the routing information managed by the route information management unit and the event information managed by the event processing unit.

BRIEF DESCRIPTION OF THE DRAWINGS

Other objects, features and advantages of the present invention will become more apparent from the following detailed description when read in conjunction with the accompanying drawings, in which:

FIG. 5 is a view showing representative items of resource information to be transmitted;

FIG. 10 is a view showing representative call setup signals regulated by a PNNI protocol;

FIG. 12 is a view showing a system for making a database of the PNNI network with PTSE according to the present invention;

FIG. 17 is a view showing a table held by the event processing unit according to the present invention;

FIG. 20 is a view showing a table held by the event processing unit according to the present invention;

FIG. 24 is a view showing a table held by the event processing unit according to the present invention;

FIG. 27 is a view showing a table held by the event processing unit according to the present invention;

FIG. 30 is a view showing a table held by the event processing unit according to the present invention;

DETAILED DESCRIPTION OF THE PREFERRED EMBODIMENTS

Figure 33:
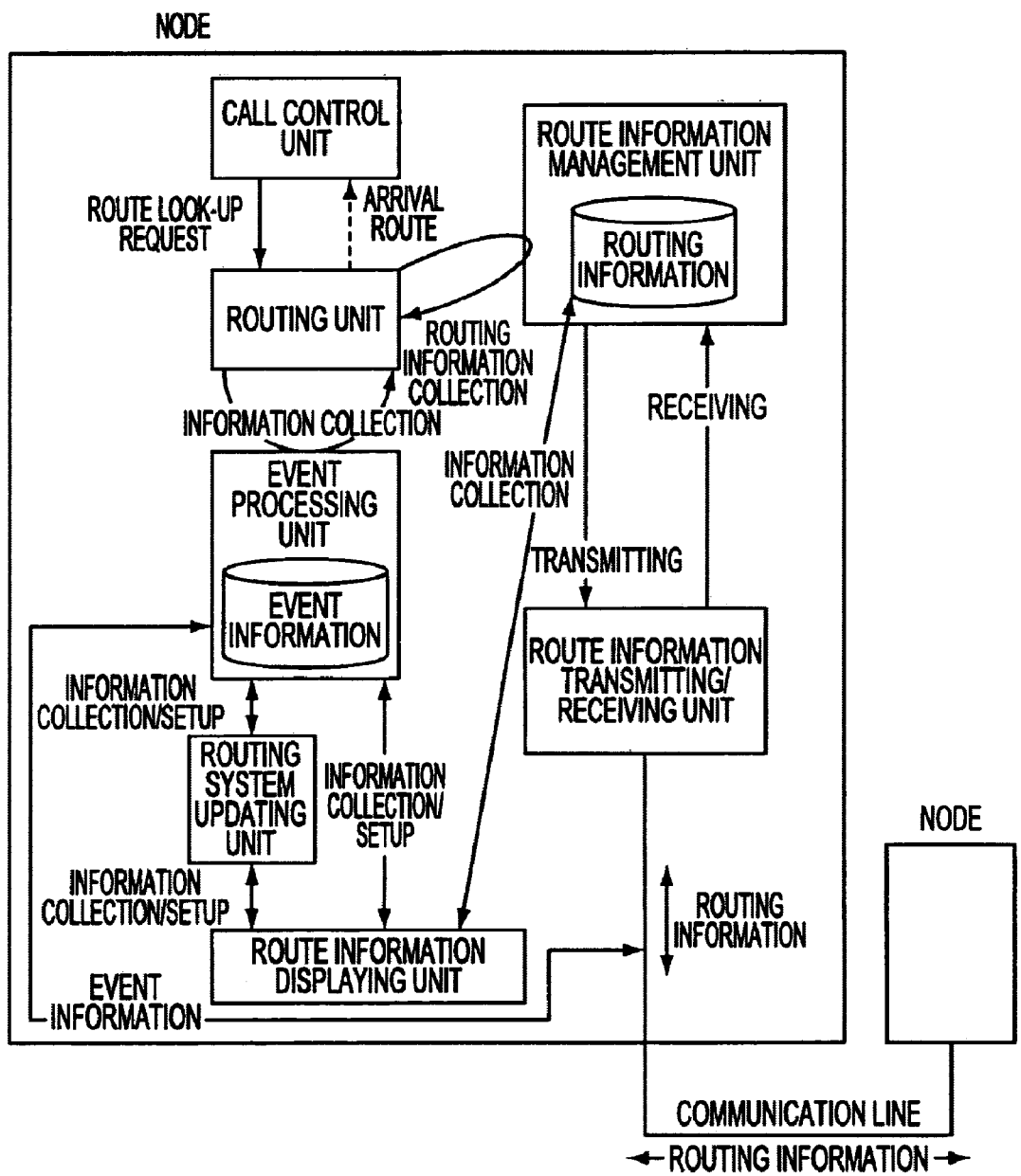
FIG. 33 is a view showing a principle of the present invention.

FIG. 33 illustrates a principle of the present invention. According to the principle, a routing system capable of designating an optimum route for a call connection request which system comprises a route information transmitting/receiving unit which exchanges standardized network route information of a local node with adjacent nodes thereof; a route information management unit which manages the standardized network route information as routing information; an event processing unit which manages event information besides the standardized network route information, the event information being obtained by detecting and statistically processing events in the local node; and a routing unit which designates an optimum route for a call connection request based on the routing information managed by the route information management unit and the event information managed by the event processing unit.

Thus, when a call connection is requested, the routing unit performs a routing by a predetermined routing process based on the existing route information managed by the route information management unit and the event information managed by the event processing unit. Hence, the routing system of the present invention can designate a route of a higher quality than that designated based on only the route information managed by the route information management unit and thus improve the convenience of the nodes.

The routing system may further comprise a route information display processing unit which integrates the routing information managed by the route information management unit and the event information managed by the event processing unit so as to display the integrated information on a maintenance interface.

Hence, the routing system of the present invention can display and disclose varying network route information in real time according to a request of the maintenance interface.

The routing system may further comprise a routing system changing unit which updates a routing process performed by the routing unit.

Thus, key data for a routing held by the event processing unit can be updated according to the request of the maintenance interface. Hence, the routing system of the prevent invention can be changeable according to the request of the maintenance interface.

The routing system may further comprise a call connection no good ("NG") event processing unit which manages event information, the event information being obtained by the event processing unit detecting the number of call connection rejection times of each line as events and processing these events statistically.

Hence, the routing system of the present invention can designate a higher quality route by taking into consideration the event of the number of call connection reject times of each line as the routing information.

The routing system may further comprise a call release event processing unit which manages event information, the event information being obtained by the event processing unit detecting call releases of each line or each reason indication for the call releases as events and processing these events statistically.

Hence, the routing system of the present invention can designate a higher quality route by taking into consideration the event of the call release of each line or each reason indication as the routing information.

The routing system may further comprise a line disconnection event processing unit which manages event information, the event information being obtained by the event processing unit detecting line disconnections of each line as events and processing these events statistically.

Hence, the routing system of the present invention can designate a higher quality route by taking into consideration the event of the line disconnections between a local node and the adjacent node as the routing information.

The routing system may further comprise a node-corresponding route information receiving event processing unit which manages event information, the event information being obtained by the event processing unit detecting receiving node-corresponding network route information from each node as events and processing these events statistically.

Hence, the routing system of the present invention can designate a higher quality route by taking into consideration the event of the node-corresponding network route information being received from the node as the routing information.

The routing system may further comprise a node-corresponding route bandwidth shortage information receiving event processing unit which manages event information, the event information being obtained by the event processing unit detecting receiving node-corresponding network route information from each node as events and processing these events statistically; the node-corresponding network route information indicating an available cell rate of each line of the node.

Hence, the routing system of the present invention can designate a higher quality route by taking into consideration the event of receiving the node-corresponding network route information indicating an available cell rate of each line of the node as the routing information.

Figure 1:
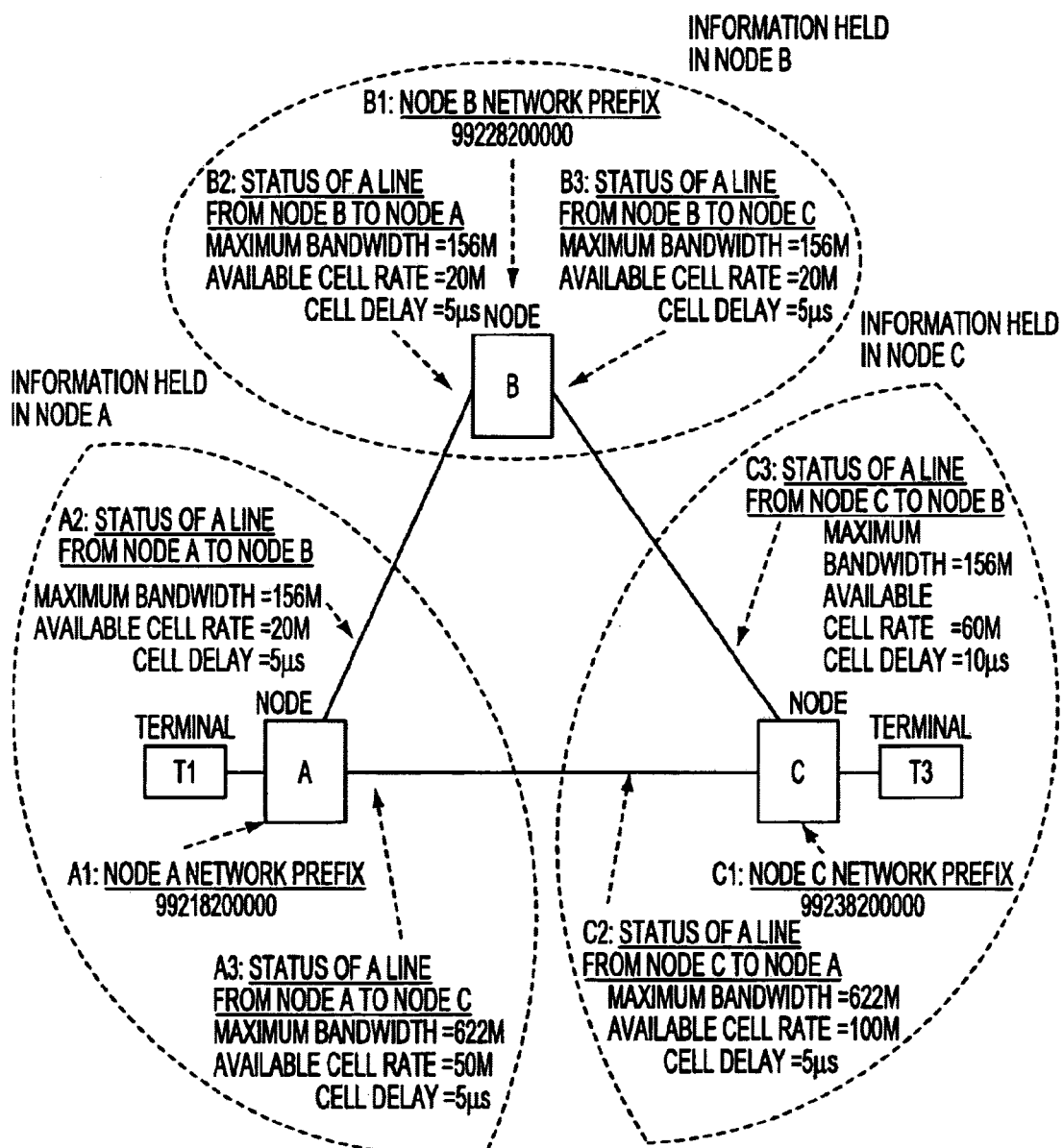
FIG. 1 is a view showing a status of resource information held in a PNNI network.
Figure 2:
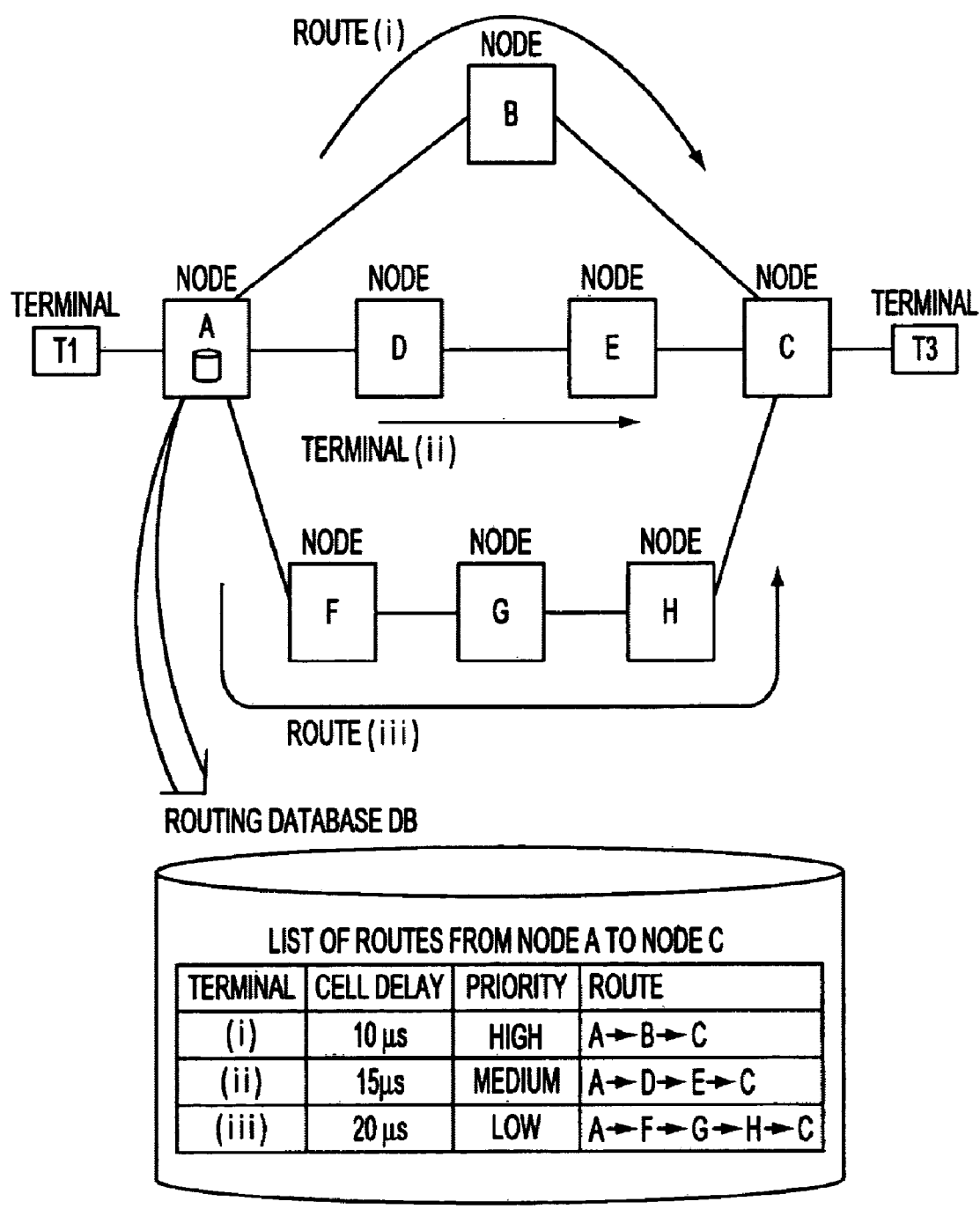
FIG. 2 is a view showing a source routing performed in the PNNI network.
Figure 3:
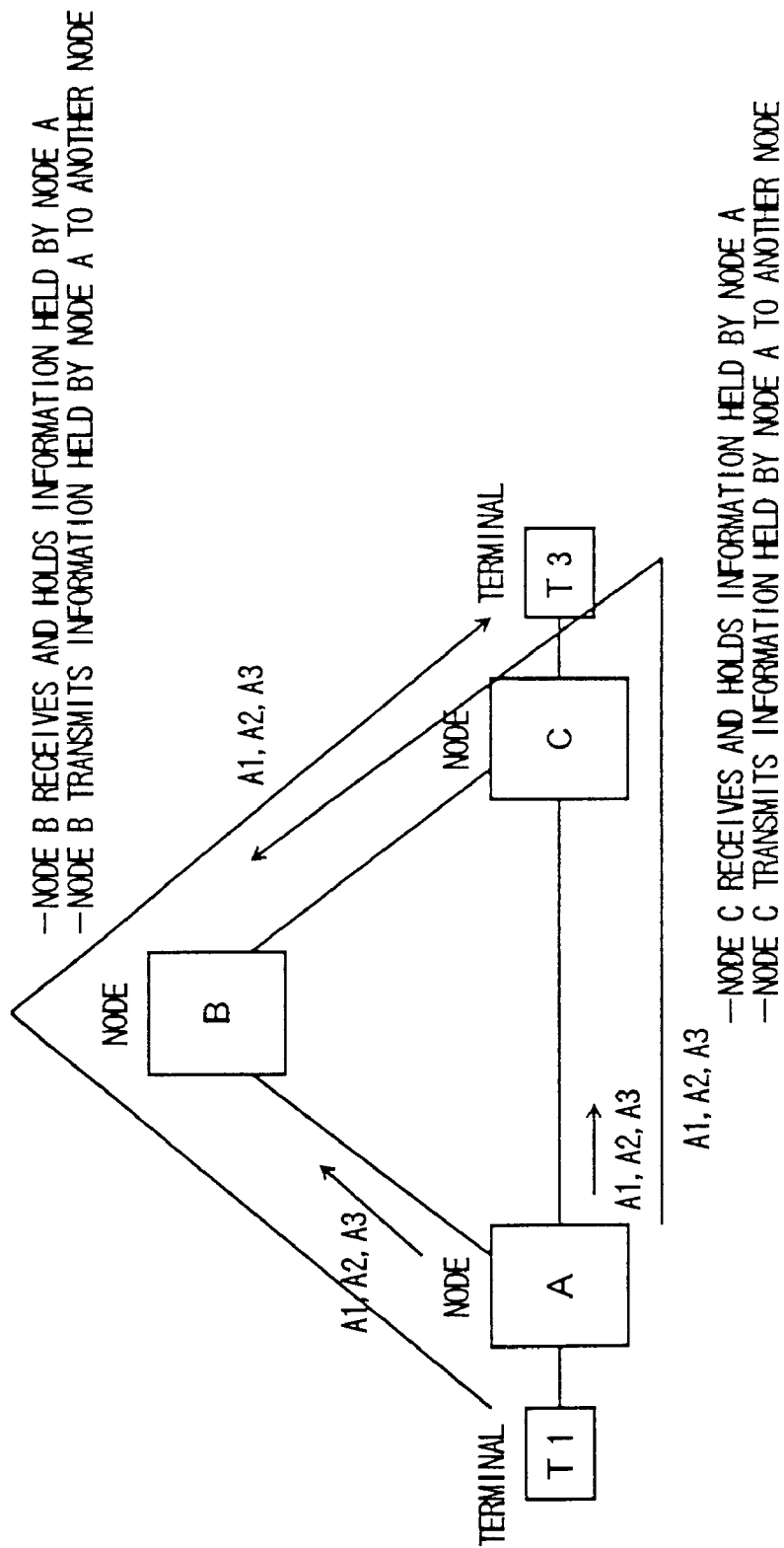
FIG. 3 is a view showing a notification of resource information delivered in the PNNI network.
Figure 4:
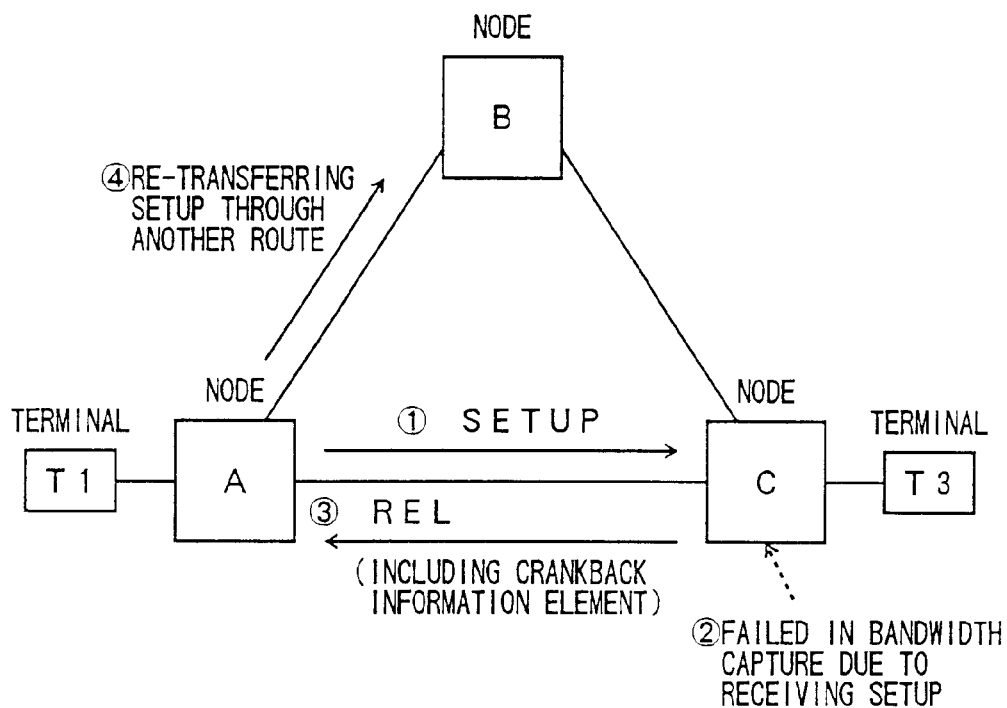
FIG. 4 is a view showing an example of a crankback procedure performed in the PNNI network.
Figure 6:
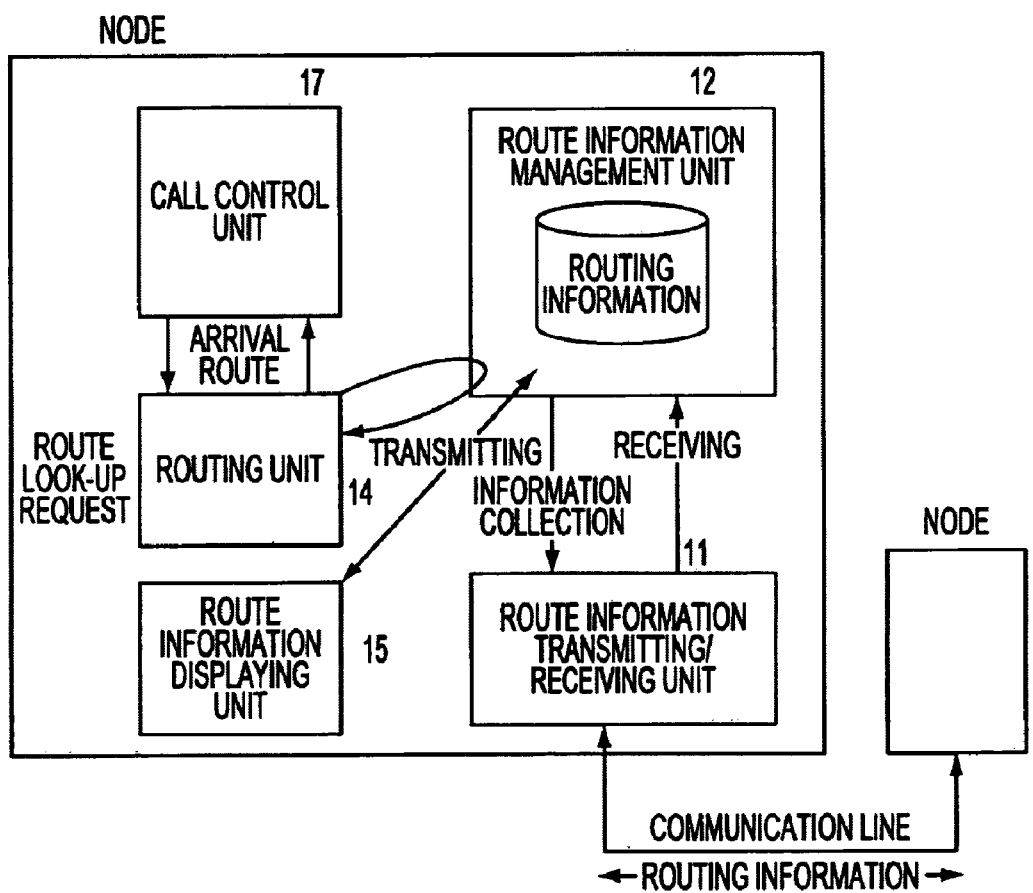
FIG. 6 is a block diagram showing an example of a conventional node.
Figure 7:
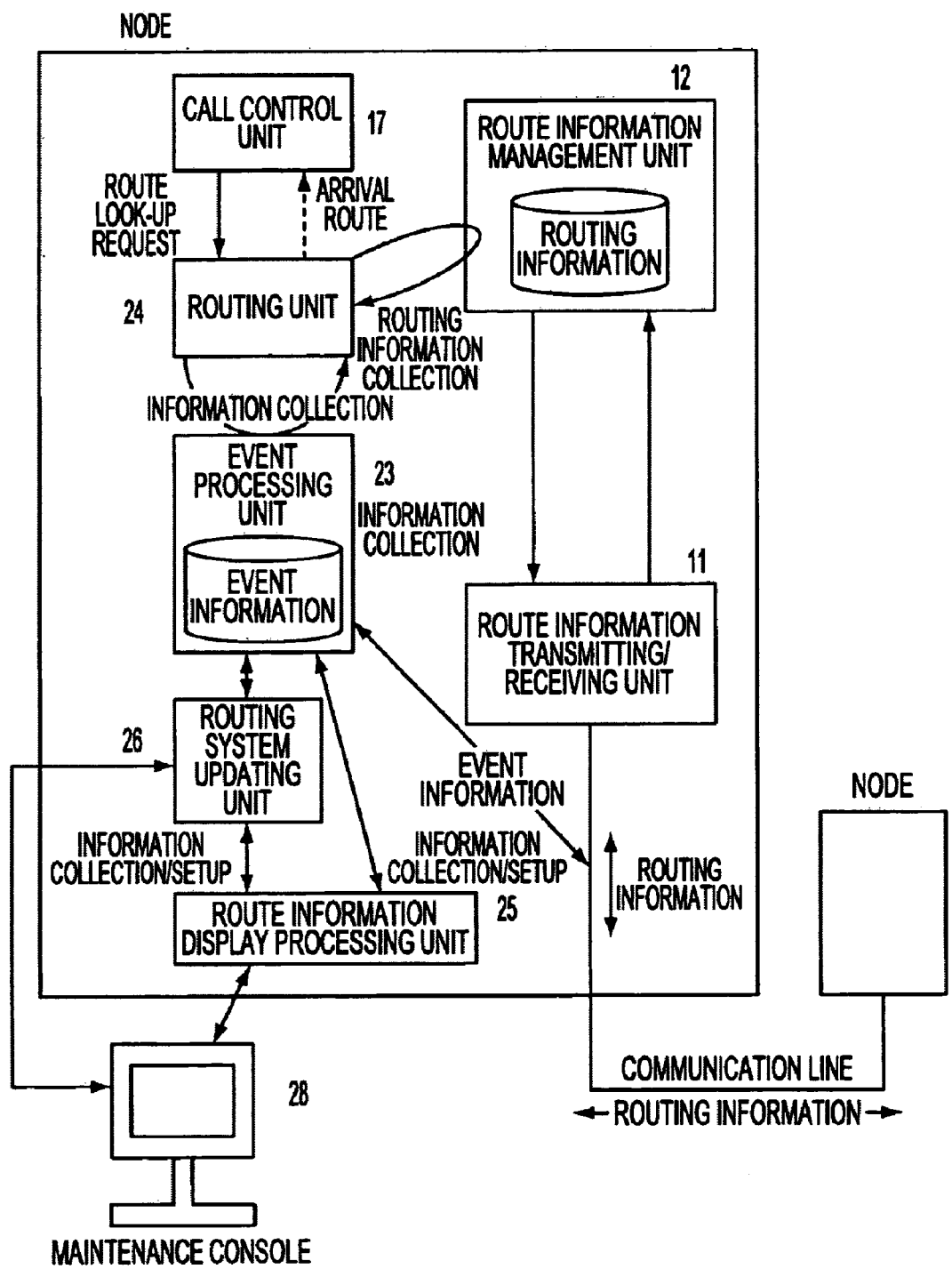
FIG. 7 is a block diagram showing an embodiment of a node according to the present invention.

FIG. 7 is a block diagram showing an embodiment of a node according to the present invention. In this diagram, the same portions as those in FIG. 6 are given the same reference numerals. In FIG. 7, a call control unit 17 issues "a route look-up request" to a routing unit 24 when a call setup is requested, and the routing unit 24 sends the call control unit 17 a route to the destination as a response. A route information management unit 12 receives resource information delivered from other nodes, sends node information about itself (the local node) and the resource information about the other nodes, and stores these information as route information (standardized network route information). A route information transmitting/receiving unit 11 delivers information between the other nodes and the route information management unit 12. A route information display processing unit 25 displays the route information held by the route information management unit 12 to users.

An event processing unit 23 detects events which are detectable in the local node besides the standardized network route information and manages information about the events on a database using a random statistical method. Further, the event processing unit 23 provides the event information according to requests from the routing unit 24, the route information display processing unit 25, a routing system changing unit 26 and the like. When a call connection is requested, the routing unit 24, based on the existing route information managed by the route information management unit 12 and the event information managed by the event processing unit 23, designates a route by a predetermined routing process. Hence, such a routing system of the present invention can designate an optimum route of a higher quality than that designated based on only the route information managed by the route information management unit 12, and thus improve the convenience of nodes in the network.

The route information display processing unit 25 may display network route information held by the local node on a maintenance console (maintenance interface) 28 according to a random request. The network route information is based on the existing route information managed by the route information management unit 12 and the event information managed by the event processing unit 23. Hence, the routing system of the present invention can display and disclose variations in the network route information in real time according to a request from the maintenance console 28, and thus improve the convenience of the nodes.

The routing system changing unit 26 updates key data for a routing which data is held by the event processing unit 23 according to a request from the maintenance console 28. Hence, the routing system of the prevent invention can be changeable according to the request of the maintenance console 28 and improve the convenience of the nodes.

Figure 8:
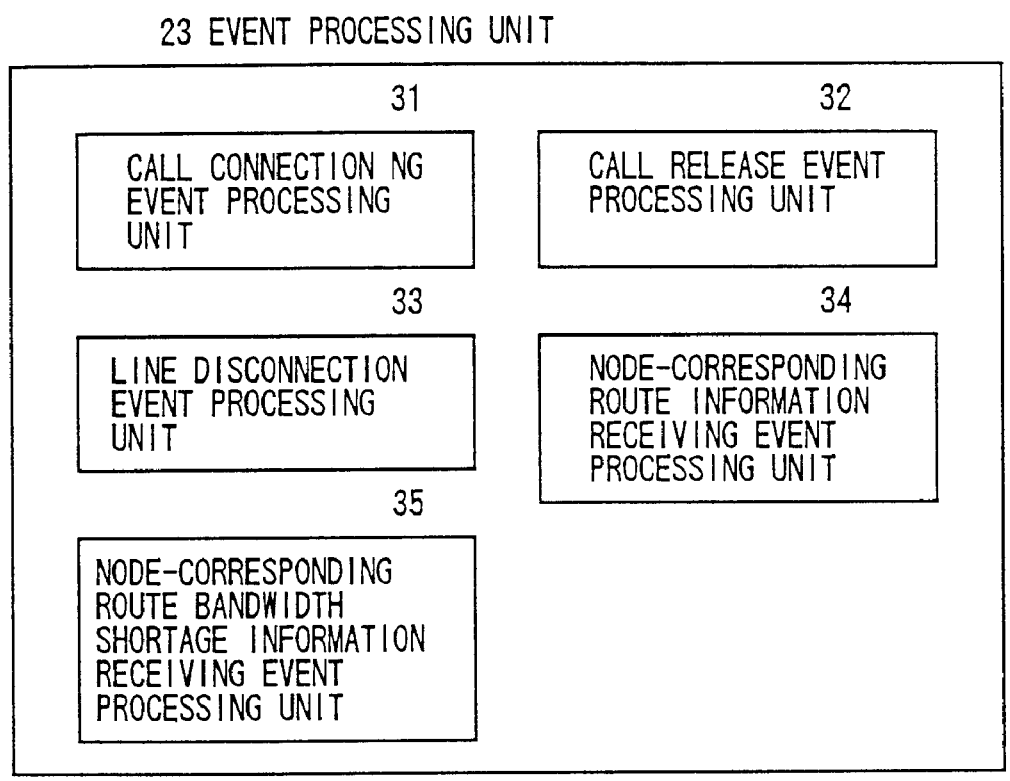
FIG. 8 is a block diagram showing an event processing unit according to the present invention.

FIG. 8 is a block diagram showing the event processing unit 23. In the diagram, a call connection NG event processing unit 31 detects an event of the number of times of a call connection NG occurred on each line (the number of times of receiving a call setup reject message with respect to a call setup message), manages information about the event on a database using a random statistical method, and provides the event information according to a request from the routing unit 24 which performs a routing. Compared to a routing system performed based on only the route information managed by the route information management unit 12, a routing system of the present invention takes into consideration the event of the number of the call connection NG times as routing information. Hence, the routing system of the present invention can designate a higher quality route and improve the convenience of the nodes.

A call release event processing unit 32 detects an event of a call release of each line or a reason indication for the call release (receiving a call release message received with respect to a call in a communication status), manages information about the event on a database using a random statistical method, and provides the event information according to a request from the routing unit 24 which performs a routing. Compared to the routing system performed based on only the route information managed by the route information management unit 12, a routing system of the present invention takes into consideration the call release event as routing information. Hence, the routing system of the present invention can designate a higher quality route and improve the convenience of the nodes.

The line disconnection event processing unit 33 detects an event of a line disconnection occurring on each line between the local node and the adjacent nodes thereof, manages information about the event on a database using a random statistical method, and provides the event information according to a request from the routing unit 24 which performs a routing. Compared to the routing system performed based on only the route information managed by the route information management unit 12, a routing system of the present invention takes into consideration the line disconnection event as routing information. Hence, the routing system of the present invention can designate a higher quality route and improve the convenience of the nodes.

A node-corresponding route information receiving event processing unit 34 detects an event of receiving node-corresponding network route information of each node, manages information about the event on a database using a random statistical method, and provides the event information according to the request from the routing unit 24 which performs a routing. Compared to the routing system performed based on only the route information managed by the route information management unit 12, a routing system of the present invention takes into consideration the event of receiving the node-corresponding network route information as routing information. Hence, the routing system of the present invention can designate a higher quality route and improve the convenience of the nodes.

A node-corresponding route bandwidth shortage information receiving event processing unit 35 detects an event of receiving node-corresponding network route information for determining whether an available cell rate of each line of a node is under a given threshold value, manages information about the event on a database using a random statistical method, and provides the event information according to the request from the routing unit 24 which performs a routing. Compared to the routing system performed based on only the route information managed by the route information management unit 12, a routing system of the present invention takes into consideration the event of receiving the node-corresponding network route information for notifying that the available cell rate of each line of the node is under a given threshold as routing information. Hence, the routing system of the present invention can designate a higher quality route and improve the convenience of the nodes.

Figure 9:
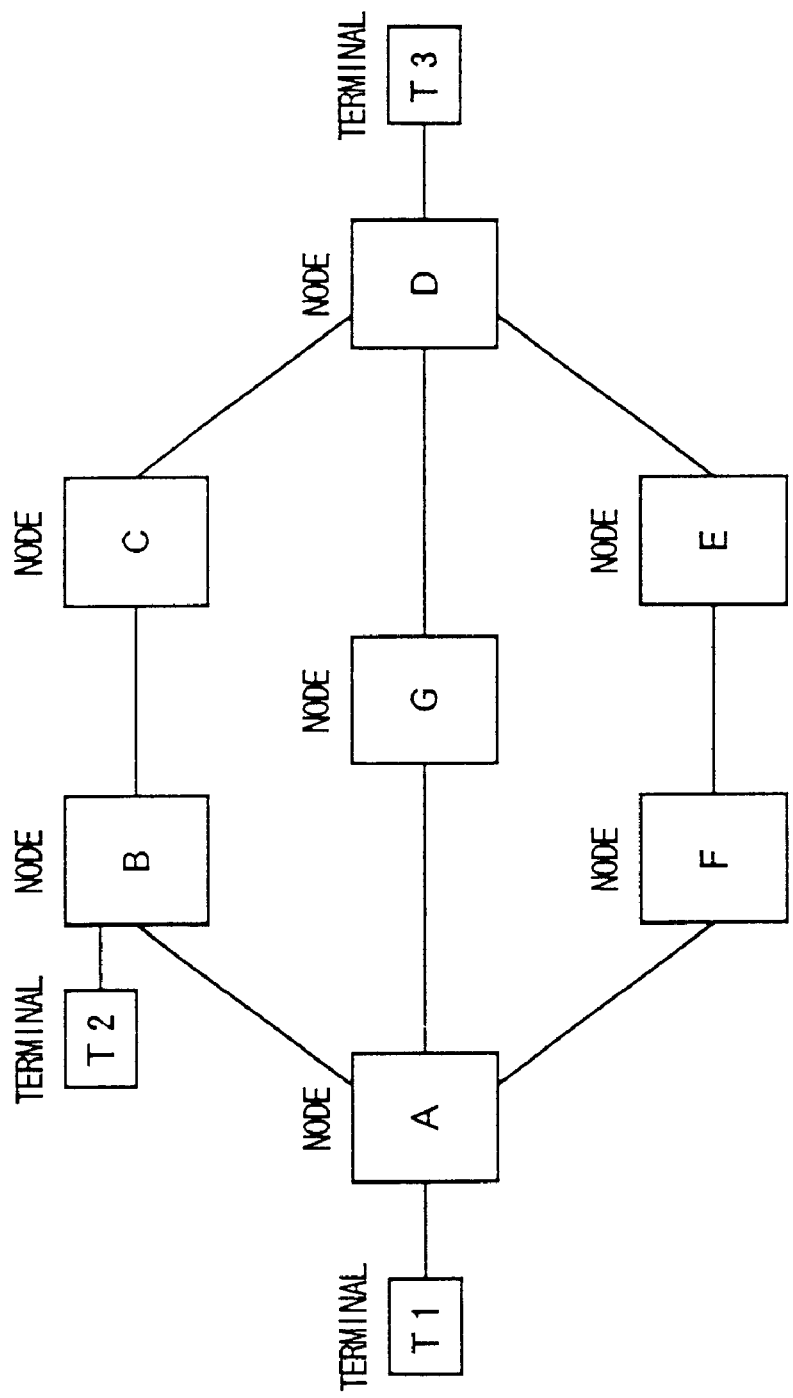
FIG. 9 is a view showing an embodiment of a network according to the present invention.

FIG. 9 is a view showing an embodiment of a network suitable to the present invention. In the diagram, reference characters A to G denote ATM nodes (hereinafter referred to as nodes), lines for connecting the nodes A to G denote ATM lines for connecting the nodes, and terminals T1, T2 and T3 denote terminals accommodated respectively in the nodes A, B and D. Each of the nodes controls a PNNI Topology State Element (PTSE) by a PNNI protocol regulated by the ATM Forum and selects lines and nodes which form a route for delivering a call setup signal from an originating terminal to an accepting terminal. Further, each node sets up paths inside the node according to the route consisting of the selected lines and nodes.

Figure 11:
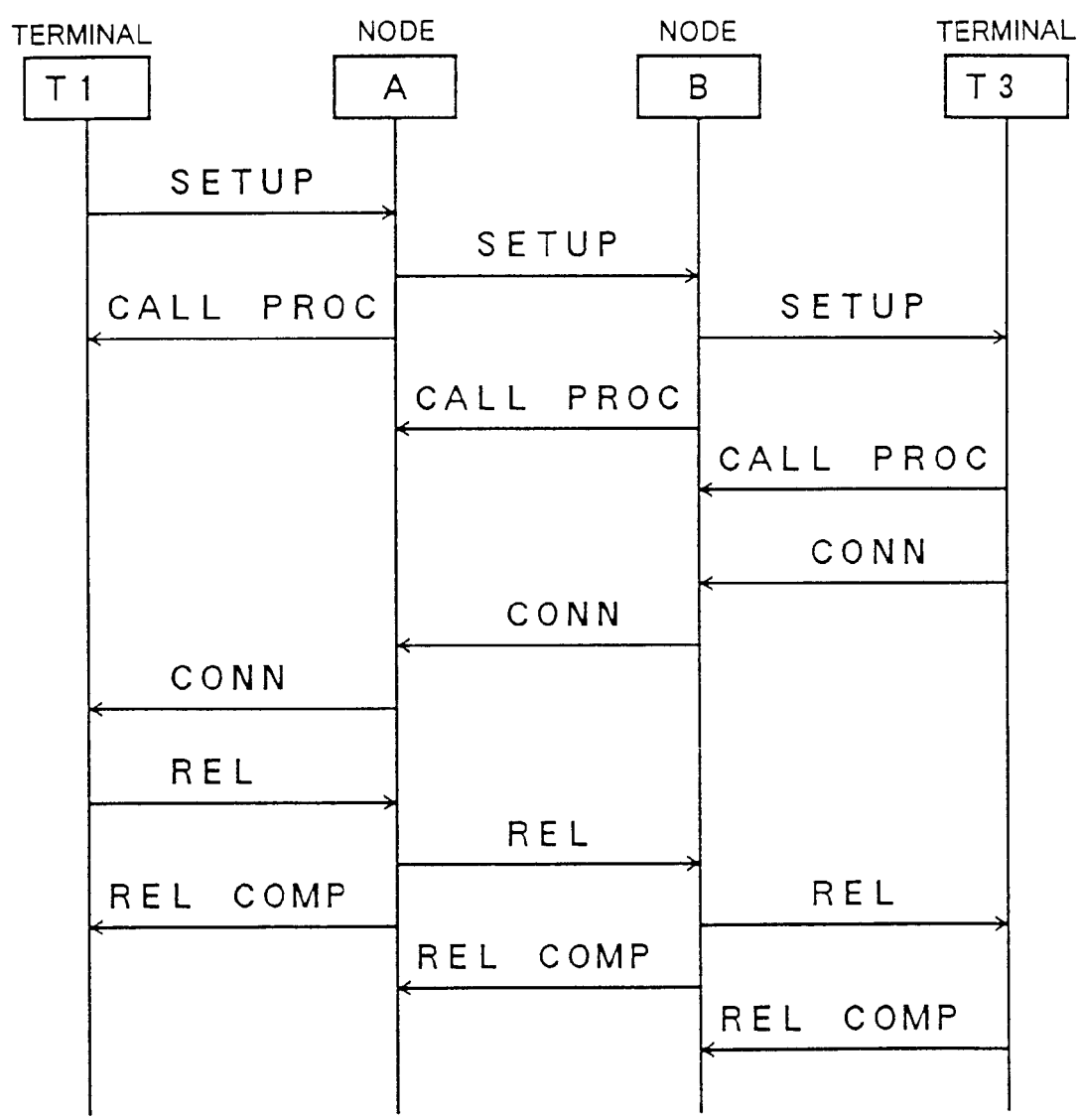
FIG. 11 is a view showing a call setup/release system performed from a terminal T1 to a terminal T3 by the PNNI protocol according to the present invention.

FIG. 10 is a view showing representative call setup signals regulated by the PNNI protocol. FIG. 11 is a view showing a call setup/release system from a terminal T1 to a terminal T3 by the PNNI protocol. FIG. 12 is a view showing a system for making a PNNI network database with PTSE. As shown in FIG. 12A, as indicating by arrows, the respective nodes A, B and C collect resource information such as an available cell rate (ACR), cell transfer delay (CTD), cell delay variation, adminstrative weight (AW) and the like. After that, as shown in FIG. 12B, the respective nodes A, B and C generate and exchange their PTSE with each other. Then, as shown in FIG. 12C, each of the nodes A, B and C makes a resource database concerning the whole PNNI network. At this time, an example of a route cost calculation is shown in FIG. 12D in which calculation routes, from the node A to the node B, from the node A to the node C, and the like are calculated.

Figure 13:
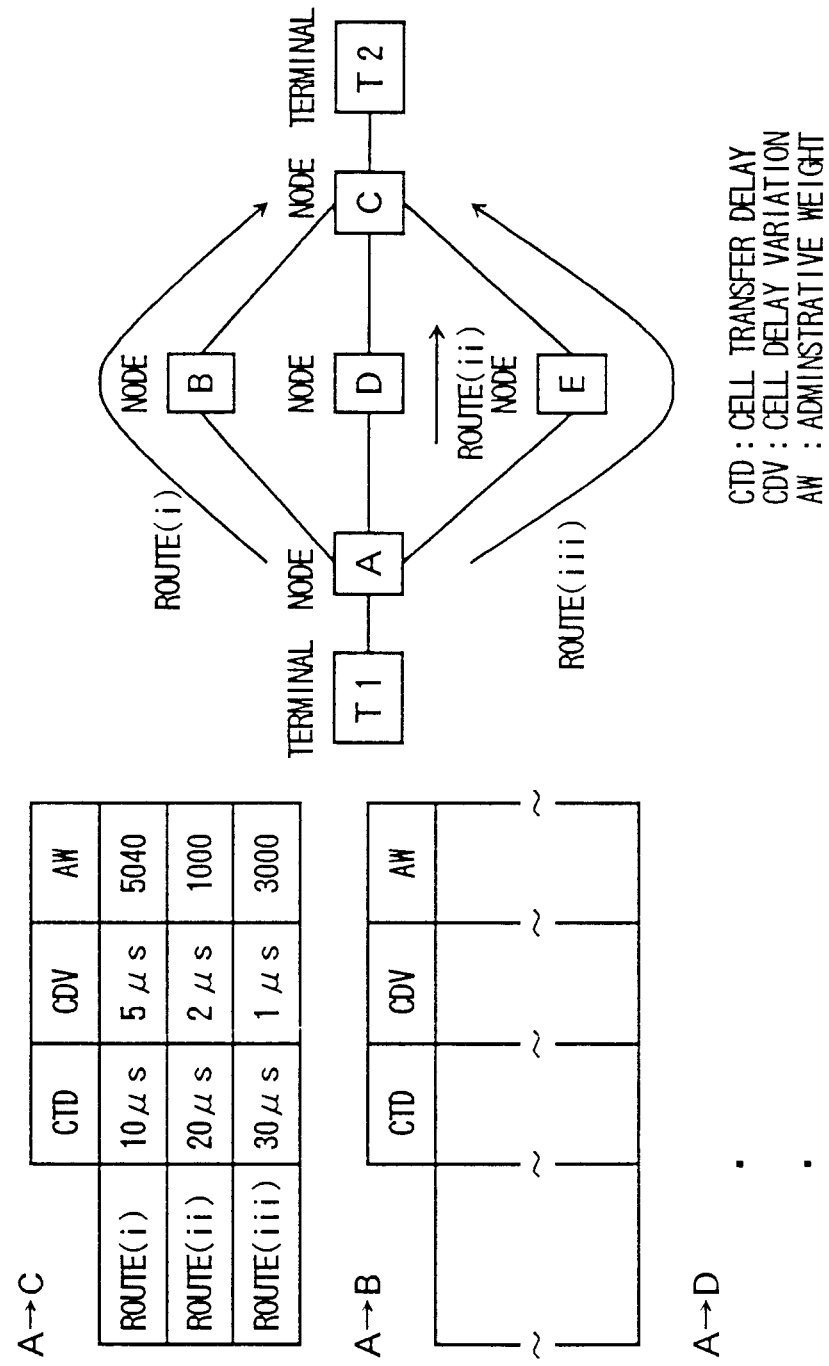
FIG. 13 is a view showing a routing system performed by using the database according to the present invention.

FIG. 13 is a view showing a routing system performed by using a database. The PTSE includes resource information about an available cell rate, ATM cell transfer delay, cell delay variation and the like. The resource information is managed by a PTSE-generating source node. Based on the resource information, an optimum route supporting line quality demanded by an originating terminal can be designated by using the PNNI protocol. In FIG. 13, a path between the terminal T1 and the terminal T3 can be selected from among three routes from the node A to the node C, and, in this embodiment, a routing system is performed from a viewpoint that for example, the cell transfer delay should be short.

As described above, an optimum route of the present invention is designated by the event processing unit 23 and the routing unit 24 in addition to the routing system by the usual PNNI protocol.

The processing units 31 to 35 of the event processing unit 23 will now be further explained.

(1) Call Connection NG Event Processing Unit

Figure 14:
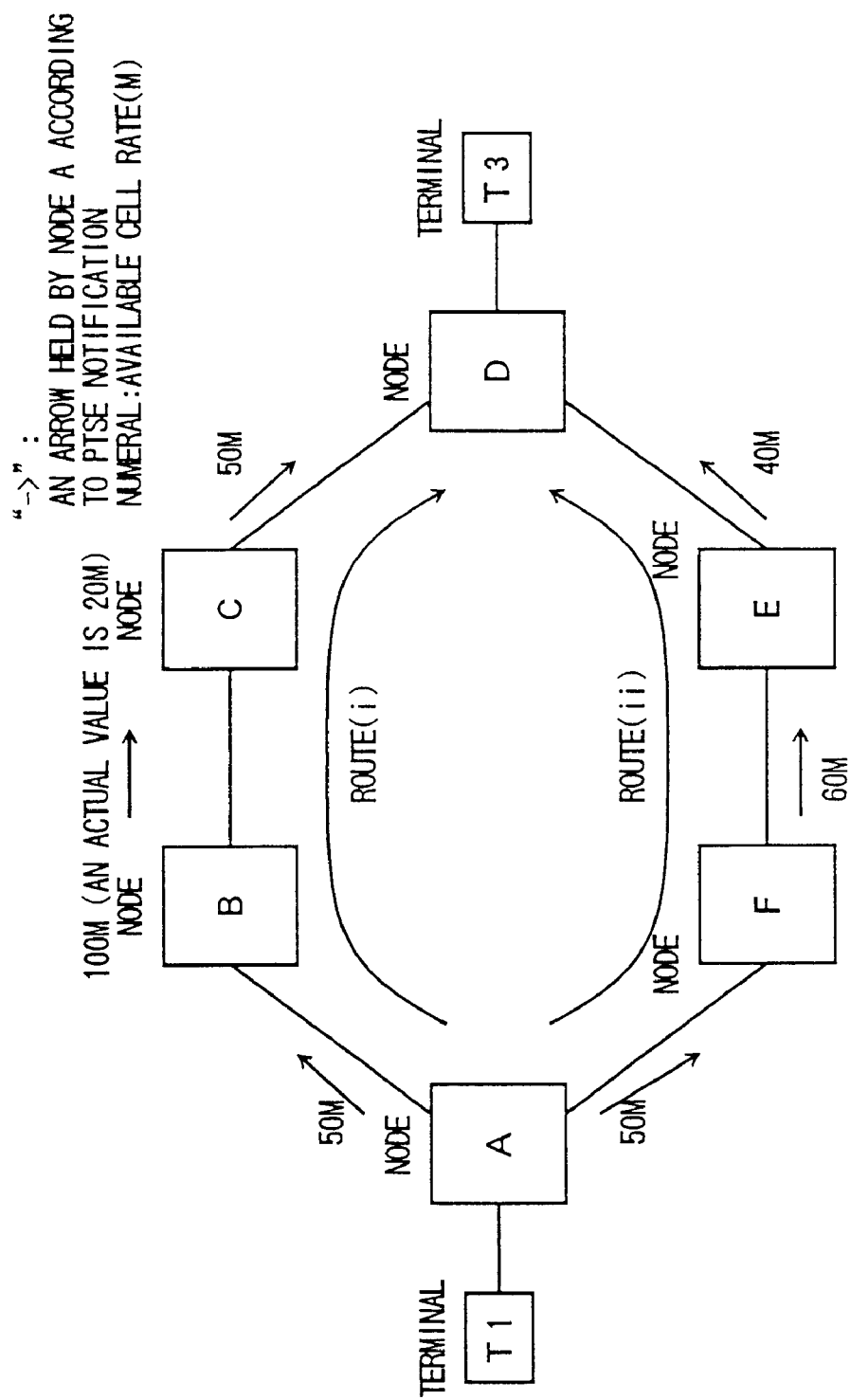
FIG. 14 is a view of a network for illustrating a call connection NG event processing unit according to the present invention.

In FIG. 14, suppose that a node B is a node which does not generate normal PTSE due to incorrect software processing. As shown in this diagram, even though the node B is in fact a node which is short of available resource (bandwidth) or does not meet quality demanded by an originating terminal T1, in a case in which the node B generates PTSE which indicates that 100 Mbps is available, the node A in which the terminal T1 is accommodated cannot perform a routing which reflects an actual status of the network, and since a route (i) meets conditions as an optimum route, the route (i) is designated to be a first selection whenever a calling is requested.

Figure 15:
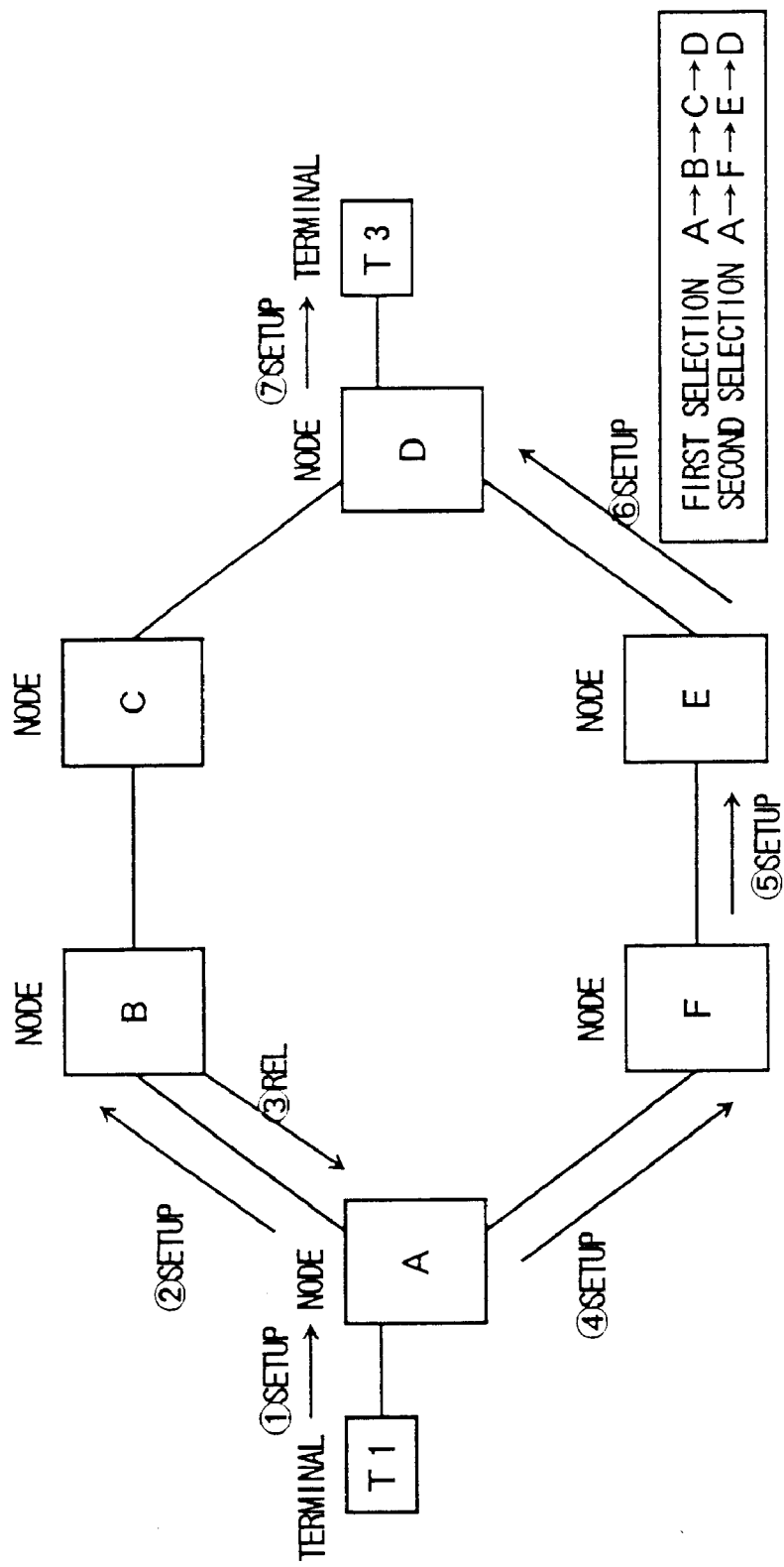
FIG. 15 is a view of a network for illustrating a crankback procedure according to the present invention.

On the other hand, the PNNI protocol regulates a crankback procedure in which, if a calling request is rejected on the first selection route, a second selection route will be designated by a procedure shown in FIG. 15. However, in this procedure, if the node B only generates incorrect PTSE, then the route (i) becomes the first selection and thereby the network is congested by transmitting/receiving useless call setup messages and the call setup delay increases.

On the contrary, according to the present invention, a route on which the call connection NG frequently occurs can be detected by using the call connection NG event processing unit 31. The call connection NG event processing unit 31 is set so as to maintain a frequency of the number of times of the call connection NG occurs (the number of times of call connection rejects) in every time unit. When a frequency for a route exceeds a preset specific threshold value, the call connection NG event processing unit 31 enables the routing unit 24 not to designate the route and thus not to perform a routing by incorrect resource information obtained thereafter. Hence, the useless increases in the call connection NG and network traffic and the occurrence of the call setup delay can be limited.

Figure 16:
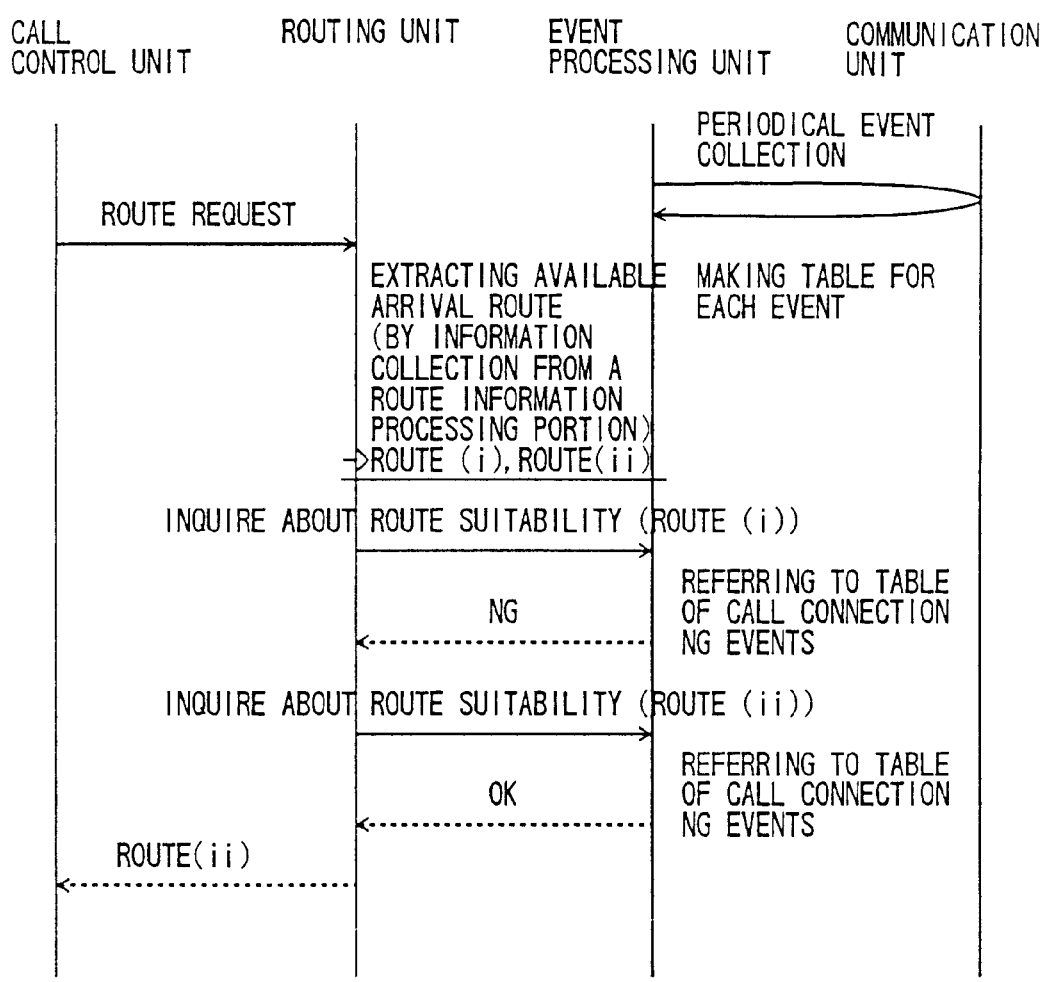
FIG. 16 is a view showing an action sequence of each unit in a case in which a call connection NG event is regarded as key information for a routing according to the present invention.
Figure 18:
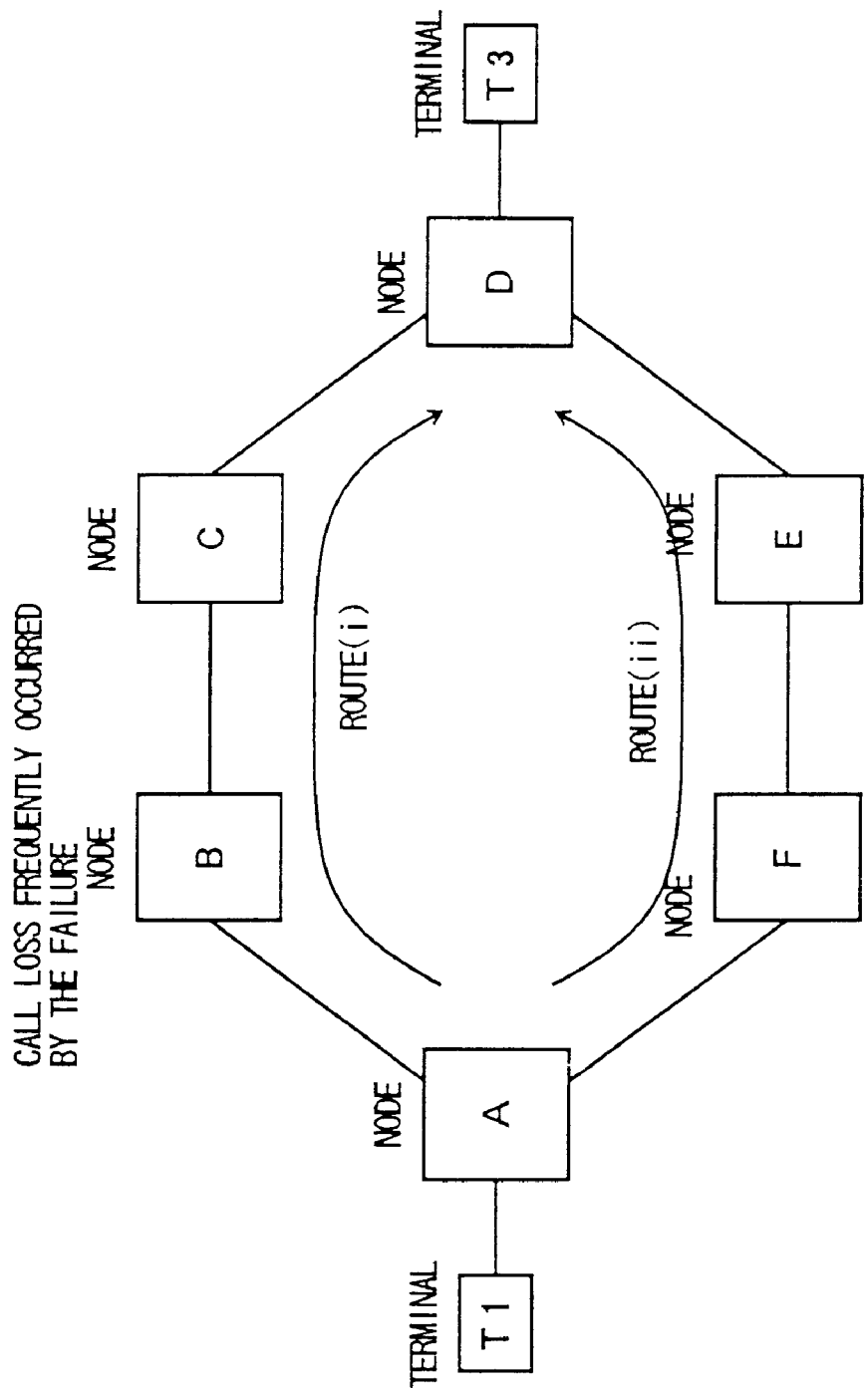
FIG. 18 is a view of a network for illustrating a call release event processing unit according to the present invention.

FIG. 16 is a view showing an action sequence of each unit in a case in which a call connection NG event is regarded as key information for routing according to the present invention. The event processing unit 23 holds a table of each event, shown in FIG. 17, and according to an inquiry about a route from the routing unit 24 judges whether the inquired-about route is operative ("OK") or no good ("NG") and sends a result of the judgement to the routing unit 24. Based on the result, the route (ii) of FIG. 14 is designated. In addition, a frequency of call connection NG may be calculated as the following formula:

Frequency of call connection NG=call connection NG times/total setup times (2) Call Release Event Processing Unit A node B in FIG. 18 is in an unstable status due to, for example, a repeating failure in which the node B fails and then resumes in a few minutes to a few hours. When the failed node B exists on a designated route, a call connection may be frequently disconnected even though the call connection has been established. However, a PNNI database is updated/completed every few minutes, and in particular when the failed node has a high priority on a route, the route on which the failed node exists may be designated based on information of the PNNI database which information is obtained at the time when the database is updated/completed, in spite of a high possibility that the call connection may be disconnected. In the present invention, the above-mentioned call disconnection (call loss) can be detected in an originating-terminal accommodating node according to causes that a source of generating a call release message is a network, a reason indication of the call release message is a network failure, and the like. Hence, the call release event processing unit 32 of the present invention manages a frequency of receiving the call release message including the specific reason indication.

In this case, the call release event processing unit 32 holds the release-message-receiving frequency at an interval of every cause that, for example, the source of generating "a network failure" or a release message is the network and not users. Holding the release-message-receiving frequency at an interval of every cause such as the reason indication and the like is to differentiate an usual call release by a user from a call release by the network failure. Thus, selecting a line on which the call loss frequently occurs due to the network failure can be prevented and thereby a line with higher safety can be selected.

Figure 19:
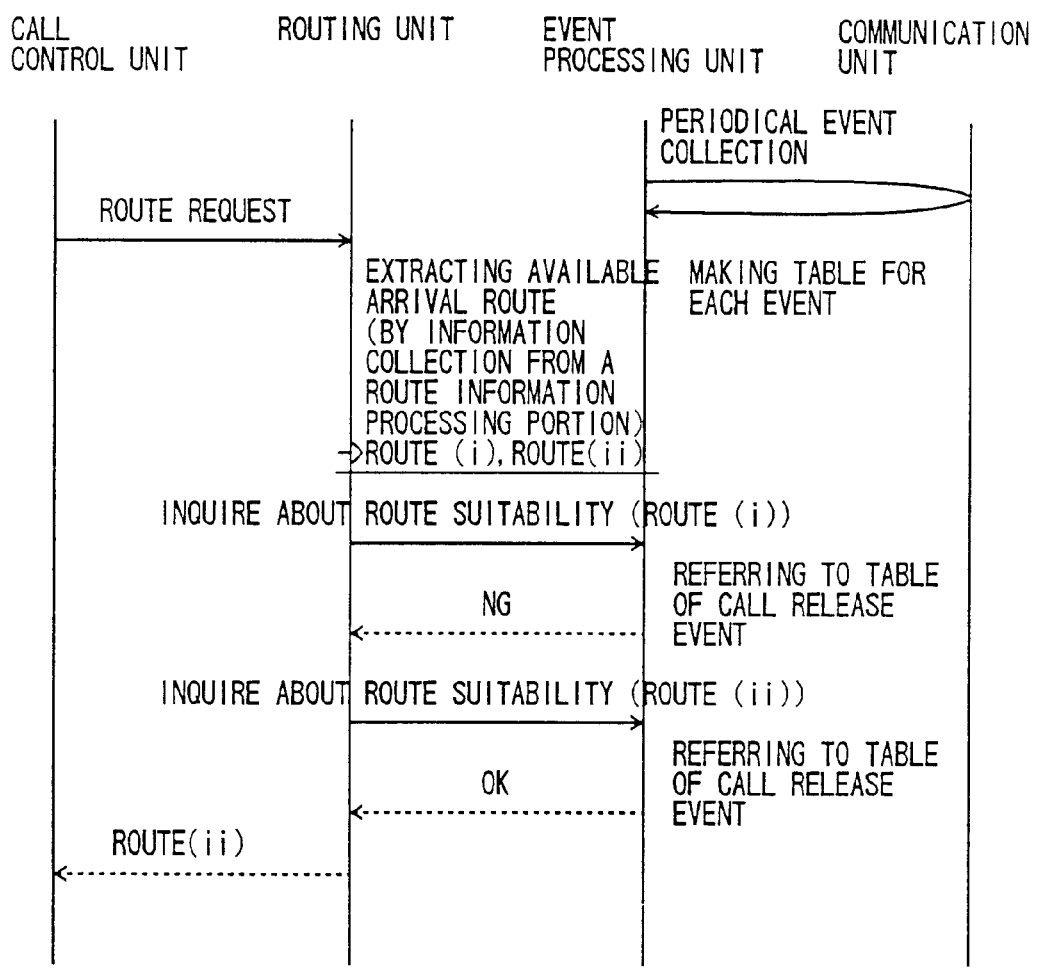
FIG. 19 is a view showing an action sequence of each of the units in a case in which a call release event is regarded as key information for a routing according to the present invention.

FIG. 19 is a view showing an action sequence of each of the units in a case in which a call release event is regarded as key information for a routing according to the present invention. The event processing unit 23 holds a table of each event shown in FIG. 20, and according to an inquiry about a route from the routing unit 24 judges whether the inquired-about route is OK or NG and sends a result of the judgement to the routing unit 24.

(3) Line Disconnection Event Processing Unit

Figure 21:
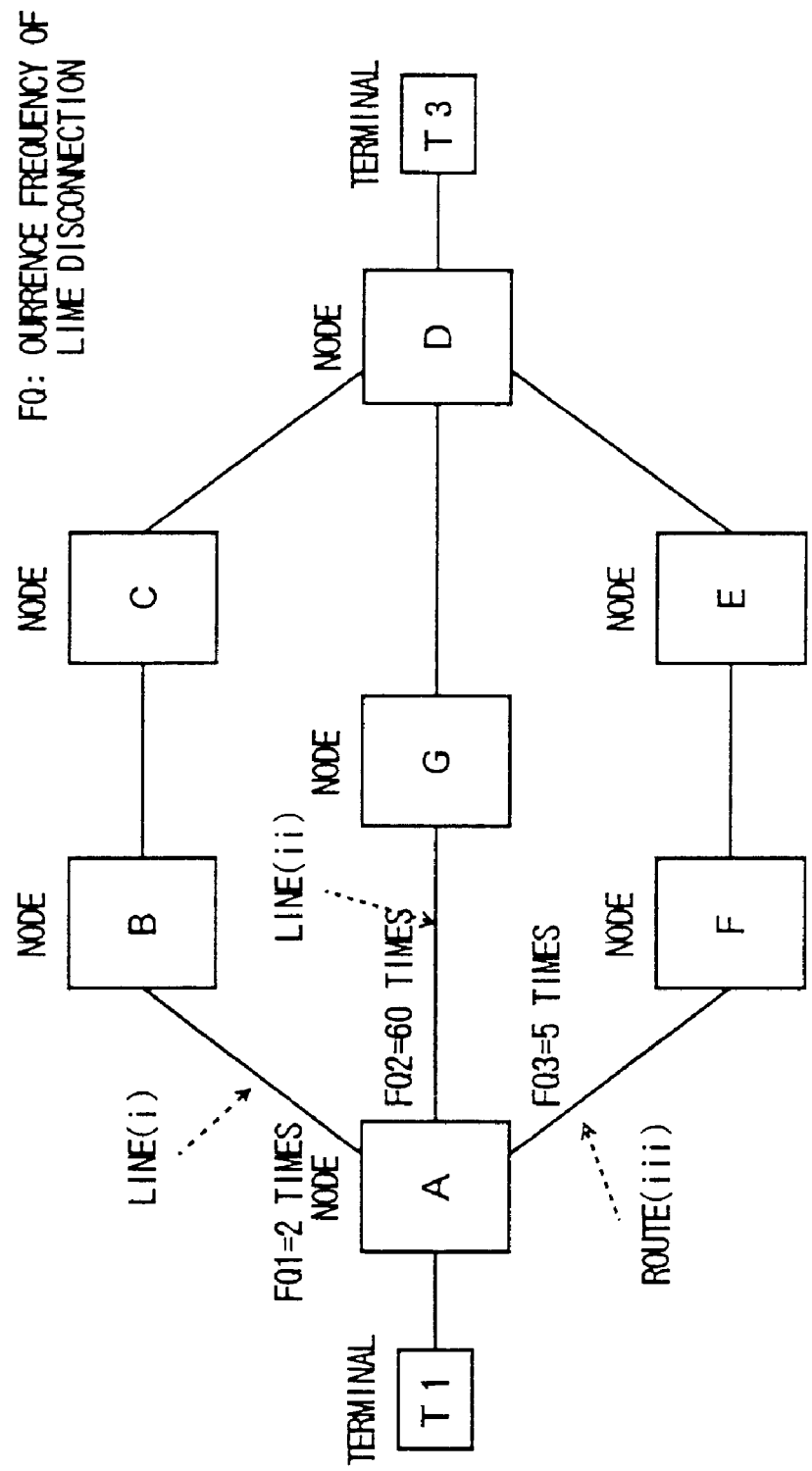
FIG. 21 is a view of a network for illustrating a line disconnection event processing unit according to the present invention.

FIG. 21 is a view for illustrating the line disconnection event processing unit 33. For the same reason as for (2), in a case in which a line between a node A and an adjacent node thereof is frequently disconnected, when a route including the line exists in a database, it is desirable not to designate the route. In the PNNI, when the node A does not exchange a Hello Packet with an adjacent node thereof in a given time (being detected by an expiration of an inactivity timer), a line disconnection with the adjacent node is detected and is reflected in a database. Thus, similarly to (2), the line disconnection event processing unit 33 has the function of managing the frequency of the inactivity timer expiration and therefore preventing from selecting the disconnected line.

Figure 22:
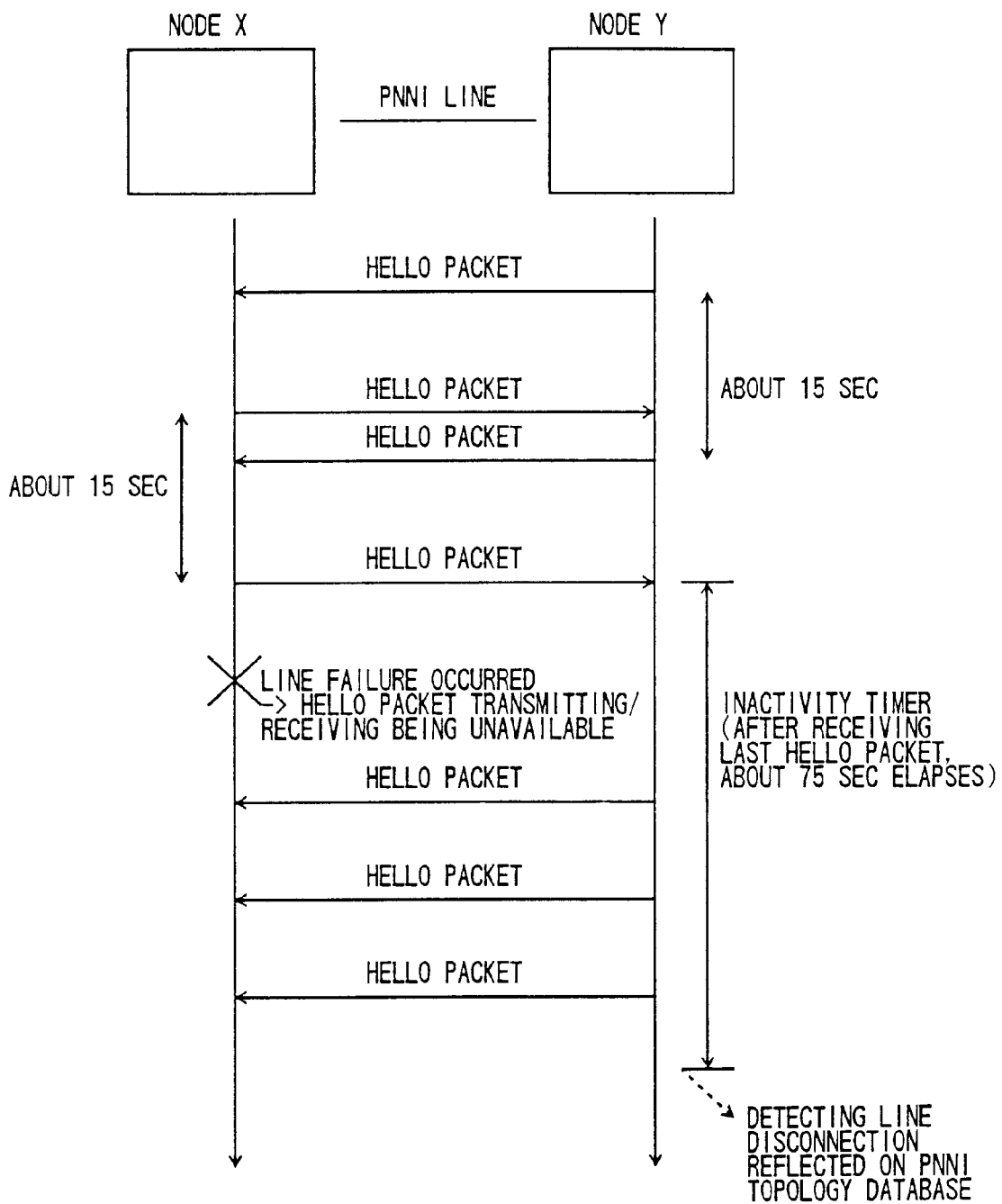
FIG. 22 is a view showing the function of an inactivity timer according to the PNNI.
Figure 23:
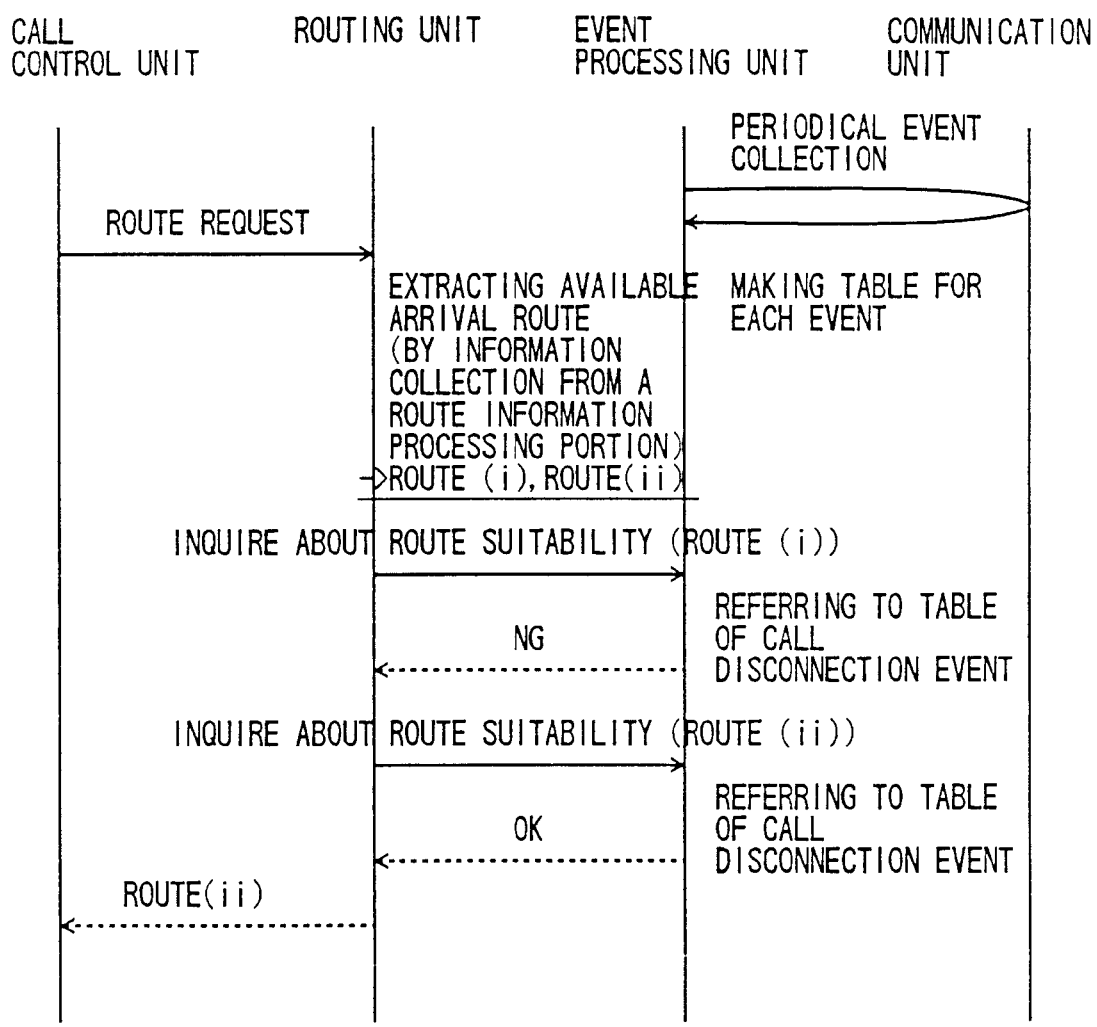
FIG. 23 is a view showing an action sequence of each of the units in a case in which a call break event is regarded as key information for a routing according to the present invention.

The function of the inactivity timer is shown in FIG. 22. FIG. 23 is a view showing an action sequence of each of the units in a case in which a call disconnection event is regarded as key information for a routing according to the present invention. The event processing unit 23 holds a table of each event, shown in FIG. 24, and according to an inquiry about a route from the routing unit 24, judges whether the inquired-about route is OK or NG and sends a result of the judgement to the routing unit 24.

(4) Node-corresponding Route Information Receiving Event Processing Unit

Figure 25:
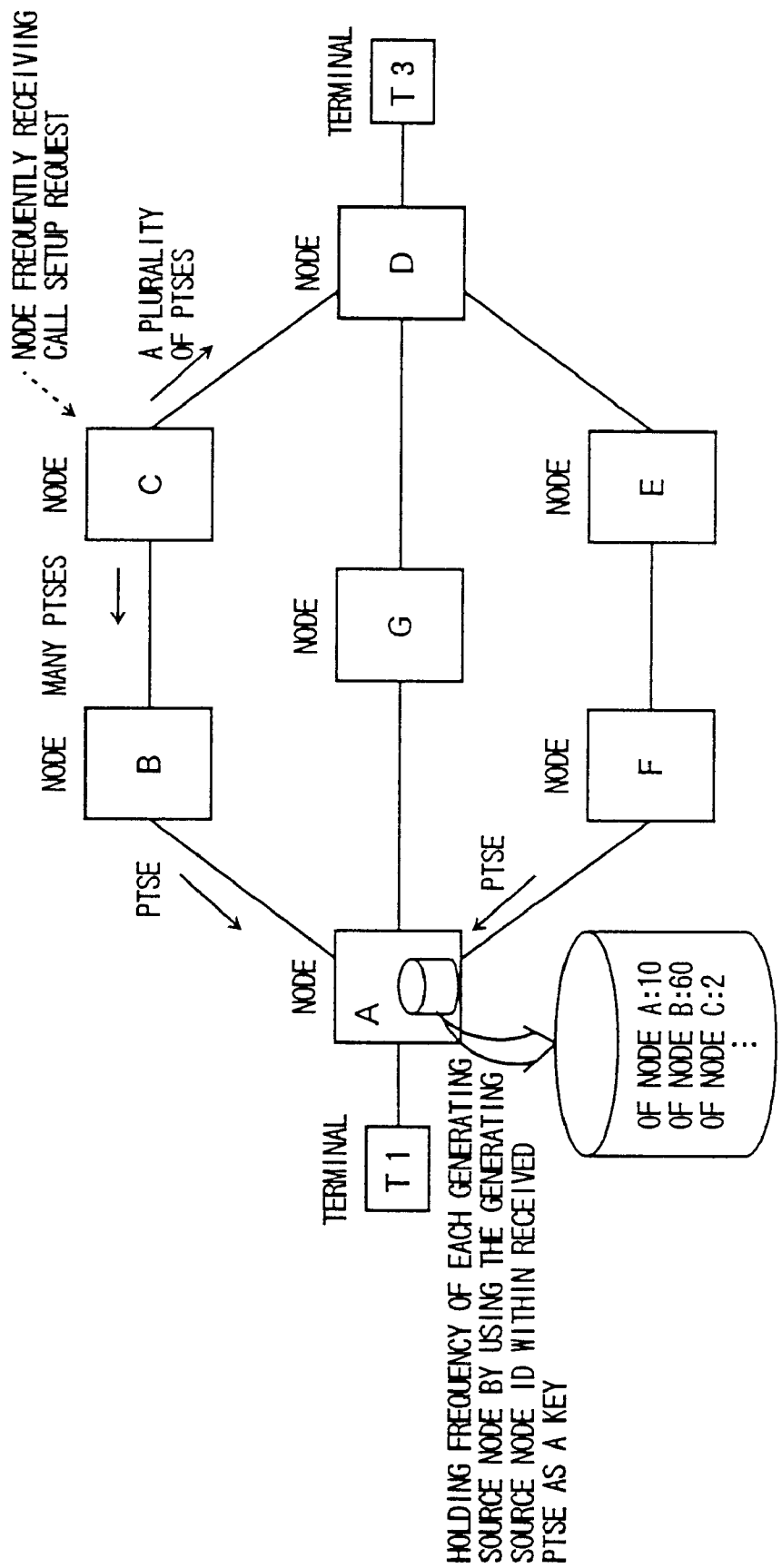
FIG. 25 is a view of a network for illustrating a node-corresponding route information receiving event processing unit according to the present invention.

FIG. 25 is a view for illustrating the node-corresponding route information receiving event processing unit 34 according to the present invention. In this diagram, a node C frequently issues PTSE. In other words, the node C frequently issues resource variation notifications. Such an event indicates that a call control request is frequently performed in the PTSE-issuing node C. The event may be regarded as an index of a load on the node C. In this case, in order to balance the load over the whole network, it is desirable not to select the node for a routing.

In order to realize the above-mentioned object, the node-corresponding route information receiving event processing unit 34 holds the frequency of receiving the PTSE corresponding to the PTSE-issuing node so as not to select the node which frequently issues the PTSE for a routing. Hence, the load on the whole network can be balanced well.

Figure 26:
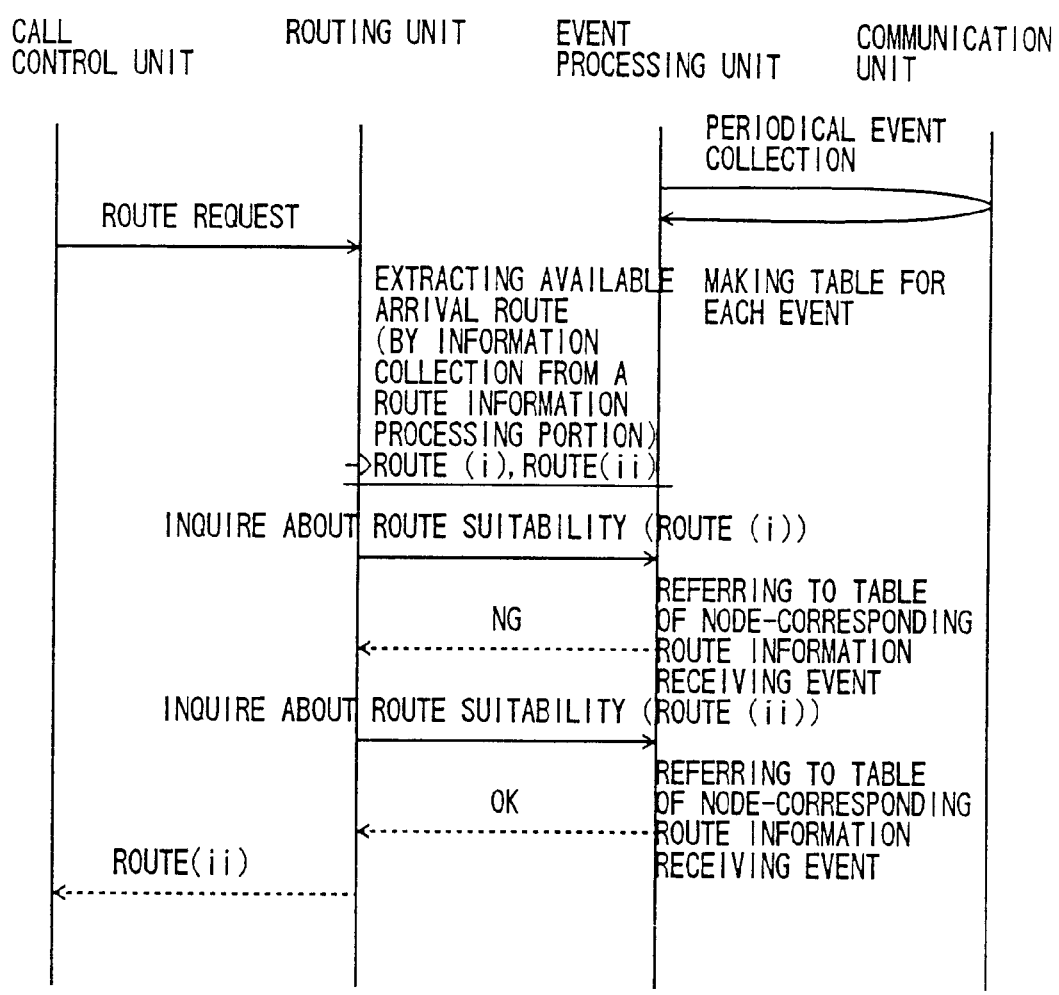
FIG. 26 is a view showing an action sequence of each of the units in a case in which a node-corresponding route information receiving event is regarded as key information for a routing according to the present invention.

FIG. 26 is a view showing an action sequence of each of the units in a case in which a node-corresponding route information receiving event is regarded as key information for a routing according to the present invention. The event processing unit 23 holds a table of each event shown in FIG. 27, and according to an inquiry about a route from the routing unit 24, judges whether the inquired-about route is OK or NG and sends a result of the judgement to the routing unit 24.

Figure 28:
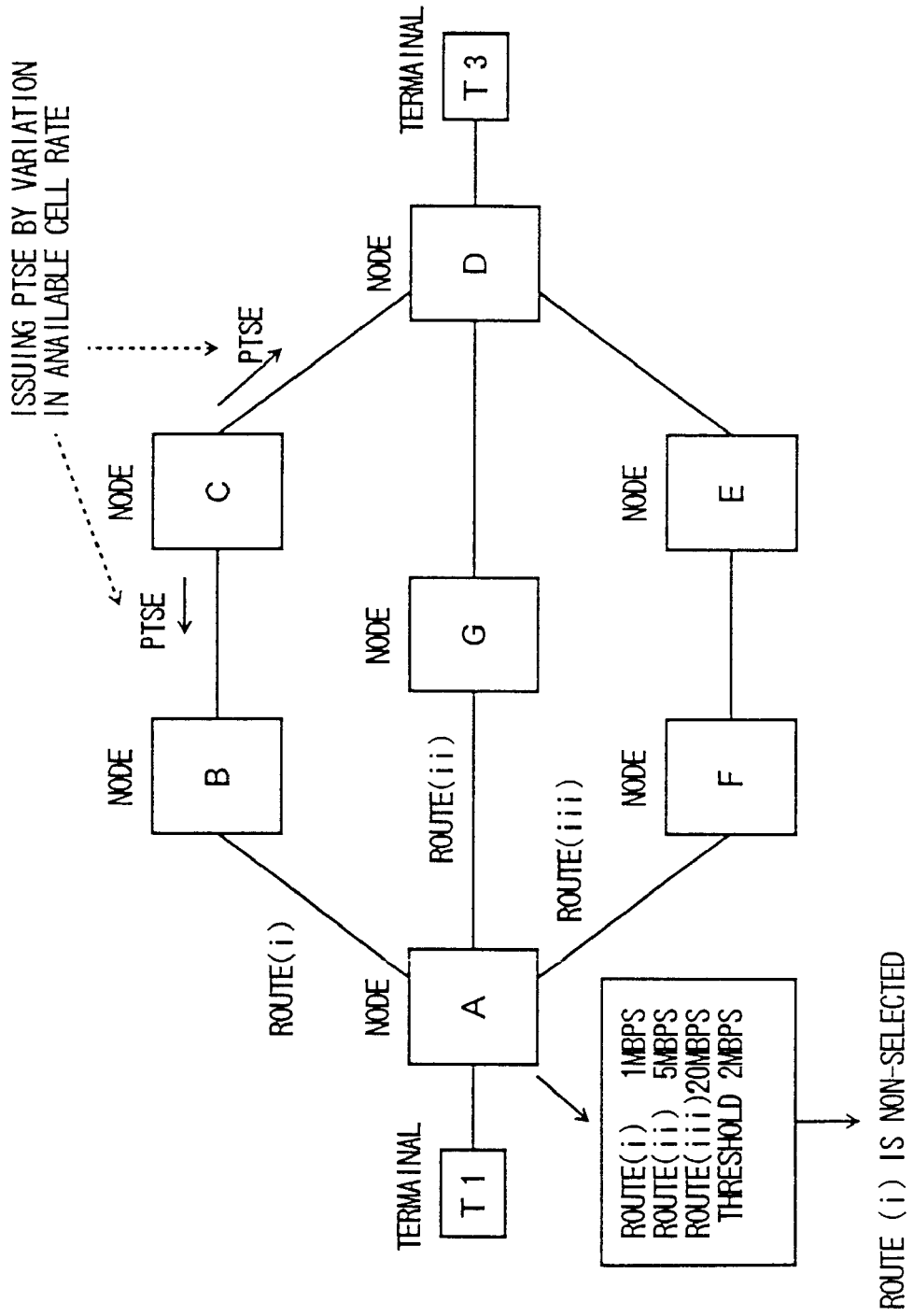
FIG. 28 is a view of a network for illustrating a node-corresponding route bandwidth shortage information receiving event processing unit according to the present invention.

(5) Node-corresponding Route Band Shortage Information Receiving Event Processing Unit FIG. 28 is a view of a network for illustrating the node-corresponding route bandwidth shortage information receiving event processing unit 35. In this diagram, a node C issues PTSE and according to contents of the PTSE, the node-corresponding route bandwidth shortage information receiving event processing unit 35 can detect an available cell rate of the PTSE-issuing node C. If the available cell rate of the node C is lower than a specific threshold value, then the unit 35 holds information about the available cell rate of the node C so as not to select the node C for a routing. Therefore, a network can be configured in which traffic is not concentrated at a specific node.

Figure 29:
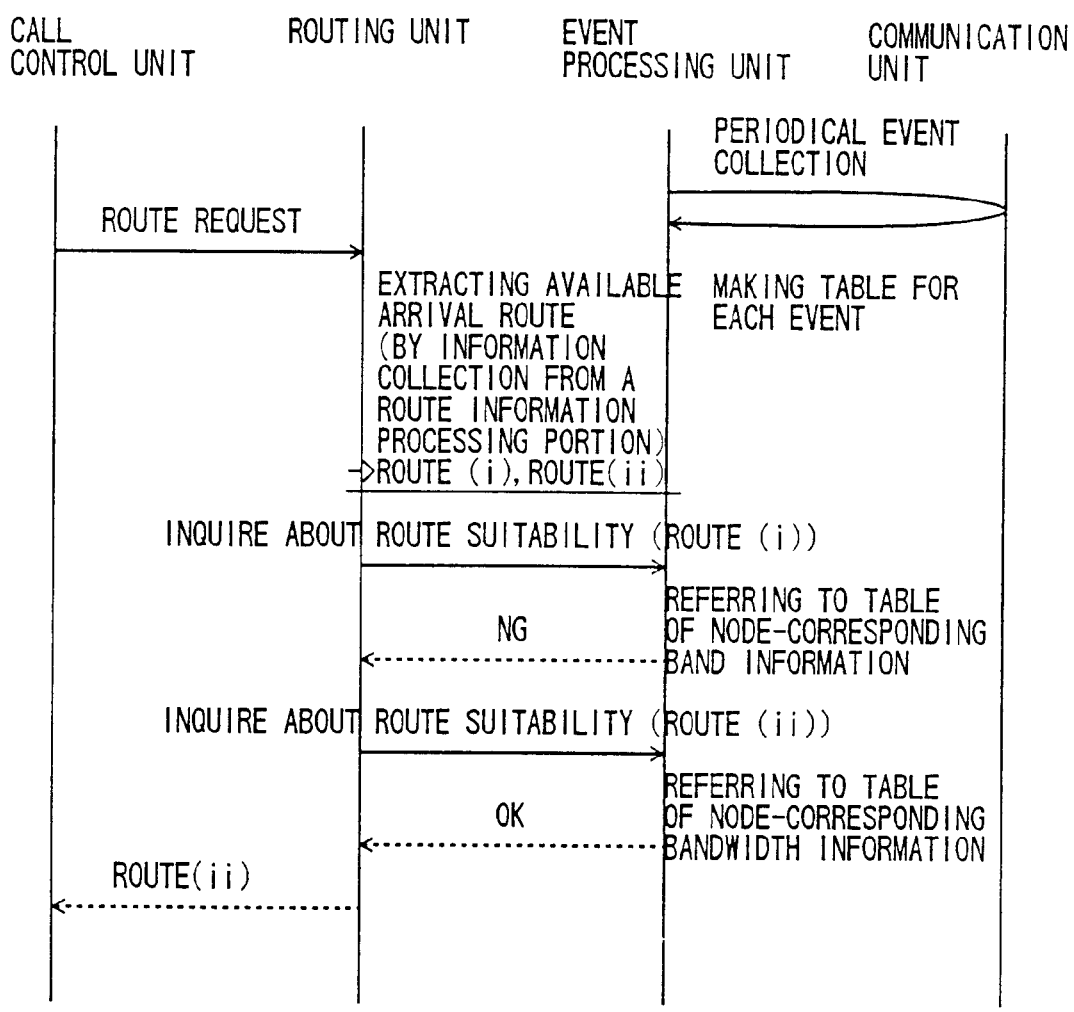
FIG. 29 is a view showing an action sequence of each of the units in a case in which a node-corresponding route bandwidth shortage information receiving event is regarded as key information for a routing according to the present invention.

FIG. 29 is a view showing an action sequence of each of the units in a case in which a node-corresponding route bandwidth shortage information receiving event is regarded as key information for a routing according to the present invention. The event processing unit 23 holds a table of each event, shown in FIG. 30, and according to an inquiry about a route from the routing unit 24 judges whether the inquired-about route is OK or NG and sends a result of the judgement to the routing unit 24.

Figure 31:
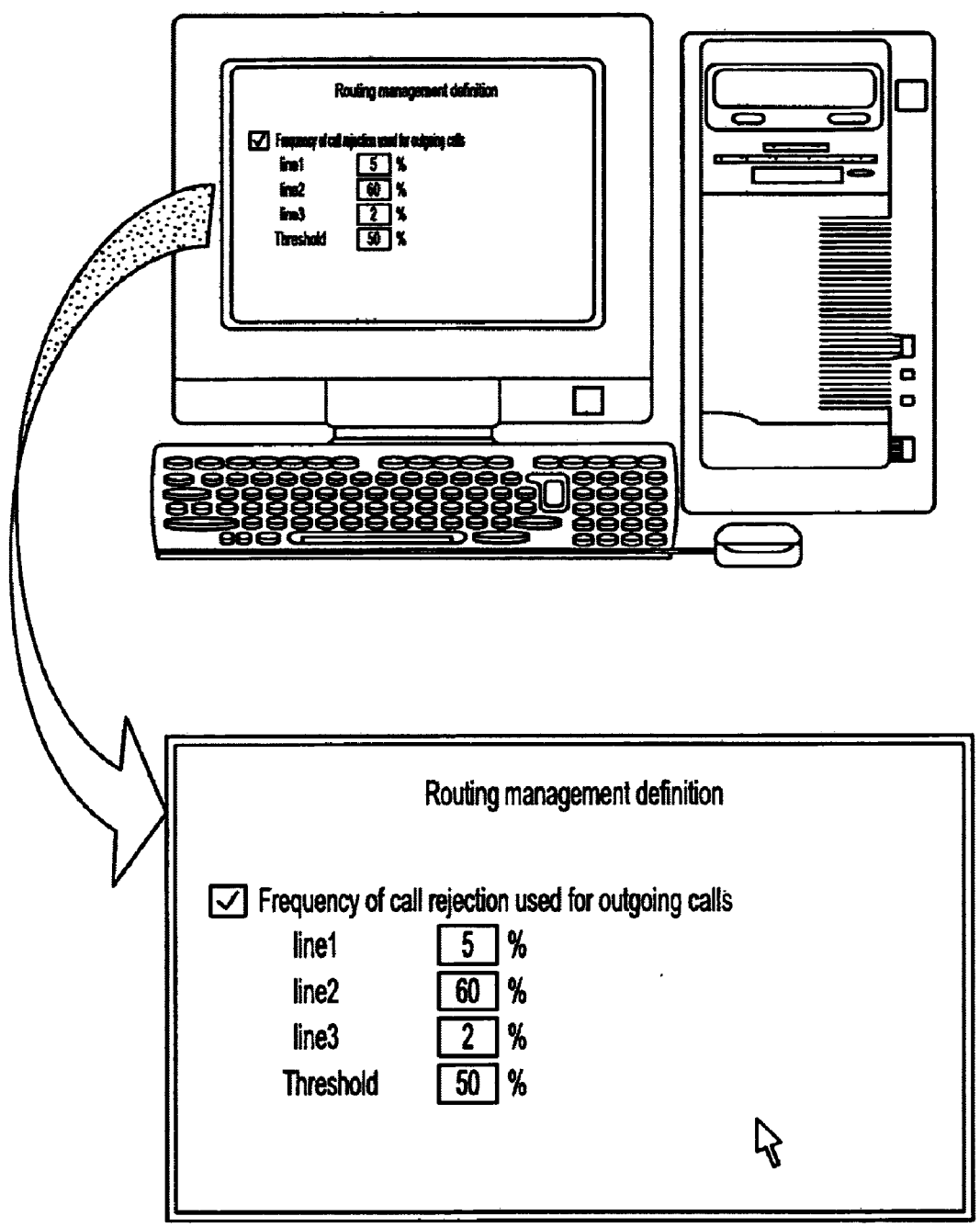
FIG. 31 is a view of an example for illustrating a route information display processing unit according to the present invention.

FIG. 31 show an example for illustrating the route information display processing unit 25 for displaying to users data collected and held by the route information management unit 12. The route information display processing unit 25 collects and displays information held by the event processing unit 23 in FIG. 7 on a screen of the maintenance console 28. Numerals of lines 1 to 3 each indicate a percentage of a frequency of call rejection which occurred on each of the present lines. In the diagram, by checking a check box of "Frequency of call rejection used for outgoing calls", whether or not to perform a routing using a particular line can be determined according to the occurrence frequency of the call connection NG times. Further, inputting a value into "Threshold" can indicated that the present invention will reject a line when the frequency percentage of the call connection NG occurring on a line reaches the value.

Figure 32:
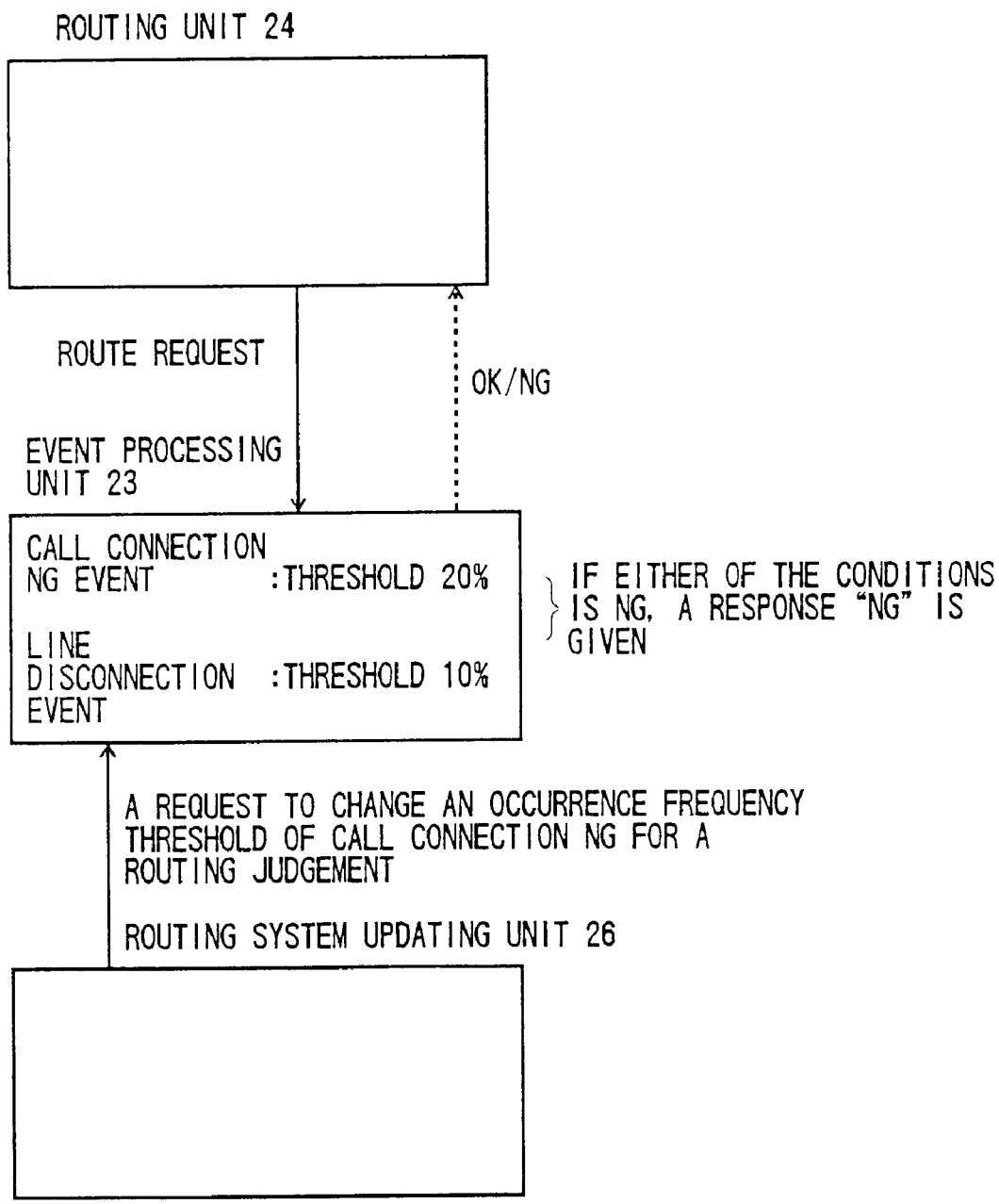
FIG. 32 is a view for illustrating a routing update processing unit according to the present invention.

The above-mentioned input is passed to the routing system changing unit 26 and integrated with other events (call release event, line disconnection event and the like) by the event processing unit 23. The integrated information is passed to the routing unit 24 for a routing. A setup from the routing system changing unit 26 in FIG. 32 is passed to the routing unit 24 to be used for the routing. The input from the maintenance console 28 is finally passed to the event processing unit 23. In this embodiment, the input includes preset conditions of judging a line disconnection event and a response to an "OK"-or-"NG" route request from the routing unit 24.

According to the present invention, a source node for designating a network route from the source node to a destination node, can avoid designating a route on which node congestion and line failures frequently occur by a database held by itself (the source node) and a routing performed according to cost measured at that time when the database is referred to. That is, besides database information obtained at that moment when the database is referred to, problems which occurred in the past on a route to be selected are used for a routing. Further, since a routing system of the present invention can selectively or integrally make use of events of the above-mentioned congestion and line failures, the routing system can be performed flexibly so as to designate an optimum route.

The foregoing description is given for the purpose of illustrating the present invention only. Of course, the present invention is not limited to the nodes shown in FIG. 7 and is also suitable to the other types of nodes (router) which for example, are equipped with OSPF protocol (RFC1131/1247/1583) in a LAN network or the like.

The present invention is not limited to the specifically disclosed examples, and variations and modifications may be made without departing from the scope of the present invention.

The present application is based on Japanese priority application No. 10-343311 filed on Dec. 2, 1998, the entire contents of which are hereby incorporated by reference.

What is claimed is:

1. A routing system which is capable of designating an optimum route for a call connection request, the routing system comprising:

a route information transmitting/receiving unit which exchanges standardized network route information of a local node with adjacent nodes thereof;

a route information management unit which manages said standardized network route information as routing information;

an event processing unit which manages statistical event information besides said standardized network route information, said event information being obtained by detecting and statistically processing events in the local node, and said statistical event information including events that affect quality of the route and/or convenience of the local node and/or adjacent nodes thereof;

wherein said event processing unit includes one or more of a call connection no good ("NG") event processing unit, a call release event processing unit, a line disconnecting event processing unit, a node-corresponding route information receiving event processing unit, and a node-corresponding route bandwidth shortage information receiving event processing unit; and a routing unit which designates an optimum route for said call connection request based on said routing information managed by said route information management unit and said statistical event information managed by said event processing unit.

2. The routing system as claimed in claim 1, further comprising a route information display processing unit which integrates said routing information managed by said route information management unit and said statistical event information managed by said event processing unit so as to display said integrated information on a maintenance interface.

3. The routing system as claimed in claim 1, further comprising a routing system changing unit which updates a routing process performed by said routing unit.

4. The routing system as claimed in claim 1, wherein the call connection NG event processing unit manages statistical event information obtained by said event processing unit detecting a number of call connection reject times of each line as events and processing these events statistically.

5. The routing system as claimed in claim 1, wherein the call release event processing unit manages statistical event information obtained by said event processing unit detecting call releases of each line or each reason indication as events and processing these events statistically.

6. The routing system as claimed in claim 1, wherein the line disconnection event processing unit manages statistical event information obtained by said event processing unit detecting line disconnections of each line as events and processing these events statistically.

7. The routing system as claimed in claim 1, wherein the node-corresponding route information receiving event processing unit manages statistical event information obtained by said event processing unit detecting receiving node-corresponding network route information from each node as events and processing these events statistically.

8. The routing system as claimed in claim 1, wherein the node-corresponding route bandwidth shortage information receiving event processing unit manages statistical event information obtained by said event processing unit detecting receiving node-corresponding network route information of the node as events and processing these events statistically; said node-corresponding network route information indicating an available cell rate of each line of the node.

9. A routing method comprising the steps of:

a) exchanging standardized network route information of a local node with adjacent nodes thereof by means of a route information transmitting/receiving unit;

b) managing said standardized network route information as routing information by means of a route information management unit;

c) managing statistical event information as well as said standardized network route information by means of an event processing unit, said statistical event information being obtained by detecting and statistically processing events in the local node, and said statistical event information including events that affect quality of the route and/or convenience of the local node and/or adjacent nodes thereof;

wherein said event processing unit includes one or more of a call connection no good ("NG") event processing unit, a call release event processing unit, a line disconnecting event processing unit, a node-corresponding route information receiving event processing unit, and a node-corresponding route bandwidth shortage information receiving event processing unit; and d) designating an optimum route for said call connection request based on said routing information managed by said route information management unit and said statistical event information managed by said event processing unit, by means of a routing unit.

10. The routing system as claimed in claim 1, wherein the routing system selectively makes use of the statistical event information in designating the optimum route for a call communication request.

11. The routing system as claimed in claim 9, wherein the routing system selectively makes use of the statistical event information in designating the optimum route for a call communication request.

12. The routing system as claimed in claim 1, wherein the events detected and statistically processed in the local node include events of congestion.

13. The routing system as claimed in claim 1, wherein the events detected and statistically processed in the local node include events of line failures.

14. The routing system as claimed in claim 1, wherein the events detected and statistically processed in the local node include events of congestion.

15. The routing system as claimed in claim 9, wherein the events detected and statistically processed in the local node include events of line failures.

* * * * *